United States Patent
Ponce Beoutis et al.

(10) Patent No.: US 10,323,296 B2
(45) Date of Patent: *Jun. 18, 2019

(54) PROCESS FOR EXTRACTION OF COPPER FROM ARSENICAL COPPER SULFIDE CONCENTRATE

(71) Applicant: Compañia de Minas Buenaventura, Lima (PE)

(72) Inventors: Percy Ponce Beoutis, Lima (PE); Juan Carlos Gustavo Plenge Thorne, Lima (PE)

(73) Assignee: Compañia de Minas Buenaventura, Lima (PE)

(*) Notice: Subject to any disclaimer, the term of this patent is extended or adjusted under 35 U.S.C. 154(b) by 0 days.

This patent is subject to a terminal disclaimer.

(21) Appl. No.: 15/997,329

(22) Filed: Jun. 4, 2018

(65) Prior Publication Data

US 2018/0282838 A1 Oct. 4, 2018

Related U.S. Application Data

(63) Continuation-in-part of application No. 15/222,887, filed on Jul. 28, 2016.

(51) Int. Cl.
*C22B 3/26* (2006.01)
*C22B 15/00* (2006.01)

(52) U.S. Cl.
CPC ........ *C22B 15/0071* (2013.01); *C22B 3/0005* (2013.01); *C22B 15/0065* (2013.01);
(Continued)

(58) Field of Classification Search
CPC ............................ C22B 15/00; C22B 15/0071; C22B 15/0089; C22B 15/0008
See application file for complete search history.

(56) References Cited

U.S. PATENT DOCUMENTS

2009/0022639 A1* 1/2009 Poijarvi ................. C22B 3/08
423/24
2015/0329937 A1* 11/2015 Salomon-de-Friedberg ..............
C22B 1/00
75/743
2018/0030573 A1 2/2018 Beoutis

FOREIGN PATENT DOCUMENTS

EP 2179967 A1 * 4/2010 ............... C01G 3/12

OTHER PUBLICATIONS

Lu, et al. "The Effect of Chloride Ions on the Dissolution of Chalcopyrite in Acidic Solutions." Hydrometallurgy. 2000. pp. 189-202. vol. 56.

* cited by examiner

*Primary Examiner* — Melissa S Swain
(74) *Attorney, Agent, or Firm* — Schwabe Williamson & Wyatt, PC

(57) ABSTRACT

A process for extraction of copper from an arsenical copper sulfide concentrate is provided. The process includes atmospheric oxidative leaching of a feed slurry including the arsenical copper sulfide concentrate and an acidic iron sulfate-containing leach solution, in the presence of oxygen, to produce a leach slurry including copper and arsenic dissolved into the leach solution. After dissolving the copper and arsenic, and before precipitating the arsenic dissolved during the oxidative leaching, pre-precipitation solids are recovered from the leach slurry to produce the pre-precipitation solids and a resulting pregnant leach solution including the copper and arsenic. Scorodite-containing seed is introduced to the pregnant leach solution including the copper and arsenic to induce precipitation of the arsenic dissolved during the oxidative leaching, as scorodite. Solids are recovered from the pregnant leach solution to produce the solids, including the scorodite, and an arsenic-reduced (Continued)

pregnant leach solution including the copper. The arsenic-reduced pregnant leach solution including the copper is subjected to solvent extraction for recovering copper and thereby producing a raffinate including sulfuric acid and iron sulfate, and at least a portion of the raffinate including the sulfuric acid and iron sulfate is recycled to the oxidative leaching.

37 Claims, 11 Drawing Sheets

(52) U.S. Cl.
CPC ......... *C22B 15/0089* (2013.01); *Y02P 10/234* (2015.11); *Y02P 10/236* (2015.11)

PROCESS FOR EXTRACTION OF COPPER FROM ARSENICAL COPPER SULFIDE CONCENTRATE

CROSS-REFERENCE TO RELATED APPLICATION

This application is a continuation-in-part of U.S. application Ser. No. 15/222,887, filed Jul. 28, 2016, the entire disclosure of which is incorporated herein by reference.

TECHNICAL FIELD

The present disclosure relates to a hydrometallurgical process for the extraction of copper from arsenical copper concentrates.

BACKGROUND

Arsenical copper ores or concentrates typically include arsenic in the form of enargite, $Cu_3AsS_4$, tennantite, $Cu_6[Cu_4(Fe, Zn)_2]As_4S_{13}$, and/or collusite $Cu_{12}VAs_3S_{16}$. These ores or concentrates also typically include other sulfide minerals, such as pyrite, and lesser amounts of chalcopyrite, chalcocite, sphalerite and/or galena. Such ores may also include economically significant quantities of gold and silver.

Arsenical copper concentrates may be processed by pyrometallurgical processes, however such processes suffer from high costs and environmental challenges, requiring complex gas handling systems and treatment processes before the arsenic can be disposed of in an environmentally acceptable manner. A few operations exist where higher arsenic-containing concentrates are first subjected to a controlled oxidizing roast to remove a significant portion of the arsenic as $As_2O_3$-containing dusts along with some of the sulfur as $SO_2$, prior to more conventional processing of the reduced arsenic concentrates. The collected $As_2O_3$ dust is problematic, however, due to a lack of market uses. In some instances, such $As_2O_3$ dusts are dissolved in water and then precipitated as a ferric arsenate, with addition of iron sulfates and oxidation, and then impounded. As a consequence, copper smelting operations are either not able to process arsenical copper concentrates, or transfer the high additional processing costs to the concentrate producers, hence restricting the production of concentrates from arsenical copper ores, and the recovery of copper therefrom.

Enargite and tennantite are refractory copper minerals that are generally considered difficult to treat hydrometallurgically. Hydrometallurgical oxidative processes have been studied, developed, and proposed for arsenical copper concentrates for several decades. However, there are no commercial operations to date, in spite of various successes claimed at the research level. Hydrometallurgical oxidation of arsenical copper concentrates, including enargite and/or tennantite under acidic atmospheric conditions, is characterized by slow leaching kinetics, largely due to the formation of elemental sulfur that creates a passivation layer that poses a barrier to copper dissolution. As a result, required leaching time to recover copper is extremely long. In addition, the arsenic must be disposed of in an environmentally stable form.

Attempts have been made to leach enargite-containing copper concentrates by acid oxidative leaching under atmospheric conditions or in autoclaves at low, medium, or high temperatures, as well as by bioleaching or alkaline leaching methods. With respect to alkaline leaching, under non-oxidative conditions with NaOH or NaOH/Na$_2$S solutions, the objective is a selective leach of the arsenic, leaving behind a low-arsenic copper sulfide product suitable for treatment by conventional pyrometallurgy. The major drawback and problem with this "selective" leach is dealing with the resultant arsenic-containing liquor. In attempts to commercially utilize this approach, arsenic was precipitated as copper arsenate by addition of copper sulfate. Other proposed processes suggested arsenic precipitation as calcium arsenate, which is environmentally much less desirable than scorodite.

Scorodite, which is a crystalline form of ferric arsenate, $FeAsO_4 \cdot 2H_2O$, is generally recognized as a stable compound for arsenic disposal. Iron must be present in the Fe-III oxidation state and arsenic in the As-V oxidation state to enable the precipitation of ferric arsenate compounds. Scorodite formation can be induced even under elevated sulfuric acid conditions, requiring a minimum molar Fe-III/As-V ratio of only 1:1, the presence of scorodite seed and elevated temperatures. In contrast, low acidity conditions (pH greater than 2) are required when amorphous ferric arsenate co-precipitates are produced, requiring molar Fe-III/As-V ratios of greater than 2:1 and preferably greater than 3:1 to produce precipitates of acceptable environmental stability.

In atmospheric oxidative leaching of arsenical copper concentrates in acidic ferric sulfate solutions, the arsenic may be removed by precipitation either during leaching or from the oxidative leach solution, i.e., after leaching and solid-liquid separation. Methods for arsenic precipitation as ferric arsenate generally suffer from drawbacks, however, such as losses of copper, excessive loss of soluble iron, loss of acid, and the use of excess neutralizing reagents.

Thus, hydrometallurgical processes for the extraction of copper from arsenical copper sulfide concentrates are generally not considered practical or economical.

Improvements in the extraction of copper from arsenical copper sulfide concentrates are desirable.

SUMMARY

According to an aspect of the present invention, there is provided a process for extraction of copper from an arsenical copper sulfide concentrate is provided. The process includes atmospheric oxidative leaching of a feed slurry including the arsenical copper sulfide concentrate and an acidic iron sulfate-containing leach solution, in the presence of oxygen, to produce a leach slurry including copper and arsenic dissolved into the leach solution. After dissolving the copper and arsenic, and before precipitating the arsenic dissolved during the oxidative leaching, pre-precipitation solids are recovered from the leach slurry to produce the pre-precipitation solids and a resulting pregnant leach solution including the copper and arsenic. Scorodite-containing seed is introduced to the pregnant leach solution including the copper and arsenic to induce precipitation of the arsenic dissolved during the oxidative leaching, as scorodite. Solids are recovered from the pregnant leach solution to produce the solids, including the scorodite, and an arsenic-reduced pregnant leach solution including the copper. The arsenic-reduced pregnant leach solution including the copper is subjected to solvent extraction for recovering copper and thereby producing a raffinate including sulfuric acid and iron sulfate, and at least a portion of the raffinate including the sulfuric acid and iron sulfate is recycled to the oxidative leaching.

The oxidative leaching may be carried out at a temperature in a range of about 80° C. to about 95° C. The entire process, including oxidative leaching, introducing scorodite, separating solids, subjecting the pregnant leach solution to solvent extraction and recycling may be carried out at a temperature in a range of about 80° C. to about 95° C.

Recovering the solids from the leach slurry may include subjecting the leach slurry to liquid/solid separation. Recovering the solids from the leach solution may also, or alternatively, include subjecting the leach slurry to flotation.

Introducing the scorodite-containing seed to the leach slurry to induce precipitation of the arsenic and precipitation of the arsenic may be carried out without adjusting acid concentration before or during precipitation of the arsenic and may be carried out after at least about 75% of the copper is dissolved. Optionally, the precipitation of the arsenic and may be carried out after at least about 95% of the copper is dissolved.

The raffinate is utilized to provide sulfuric acid and iron ions to the leach solution. Recycling may include recycling about 60% to about 90% of the raffinate to the leach circuit.

Optionally, the leach solution may contain chloride ions.

Recycling of the raffinate is a source of soluble iron in the acidic iron sulfate-containing leach solution.

The composition of the leach slurry may be controlled by controlling an extent of oxidation during oxidative leaching to control sulfuric acid content and soluble iron concentrations for copper dissolution and subsequent precipitation of arsenic as scorodite.

The leach solution may have a ferric ion concentration of at least about 10 g/L and may have a sulfuric acid concentration of about 30 g/L to about 60 g/L. The leach slurry may have a ferric ion concentration in the range of about 15 g/L to about 25 g/L prior to introducing scorodite-containing seed.

An initial concentration of solids in the feed slurry may be about 10% to about 30% by weight of solids prior to dissolution of copper and arsenic.

The leach slurry may include a carbonaceous catalyst.

Oxidation of iron-containing minerals in the arsenical copper concentrate may be controlled to achieve a molar ferric ion to arsenic ratio of at least 1:1 in the leach slurry prior to the precipitation of arsenic as scorodite. The oxidation of iron-containing minerals in the arsenical copper concentrate may be controlled to achieve a ferric ion concentration of about 15 g/L to about 25 g/L prior to the precipitation of arsenic as scorodite.

The arsenic may be precipitated at a temperature of about 90° C. to about 95° C. The amount of scorodite-containing seed introduced may be selected to provide an arsenic mass ratio of the arsenic in the scorodite seed material to the soluble arsenic in the leach slurry in the range of about 3.5:1 to about 4.5:1. A portion of the solids, including the scorodite, may be introduced to the leach slurry as the scorodite-containing seed to induce the precipitation of the arsenic dissolved during the oxidative leaching, as scorodite. The scorodite-containing seed material may be obtained by flotation of the leach slurry, including the scorodite, to produce a flotation concentrate and scorodite-rich flotation tailings.

Separating the solids in the leach slurry may include subjecting the leach slurry, after precipitating the arsenic, to a flotation, without prior liquid/solid separation, to produce a flotation concentrate and scorodite-rich flotation tailings, wherein the scorodite-containing seed material comprises a portion of the flotation tailings.

Recovering the pre-precipitation solids from the leach slurry may include subjecting the leach slurry to liquid/solid separation, which may include subjecting the leach slurry to thickening, filtration, or both. The liquid/solid separation may include washing at least some separated solids, and combining at least some of the produced washing liquor with the pregnant leach solution. Recovering the pre-precipitation solids from the leach slurry may remove at least 90 wt %, at least 95 wt %, at least 99 wt %, or substantially all of the solids present in the post-oxidative leach slurry.

The process may include re-grinding of the copper sulfide concentrate prior to oxidative leaching. The regrinding may be carried out to provide a particle size distribution $P_{80}$ of about 15 μm to about 25 μm.

DRAWINGS

Embodiments of the present invention will be described, by way of example, with reference to the drawings and to the following description, in which.

DETAILED DESCRIPTION

Figure 1:
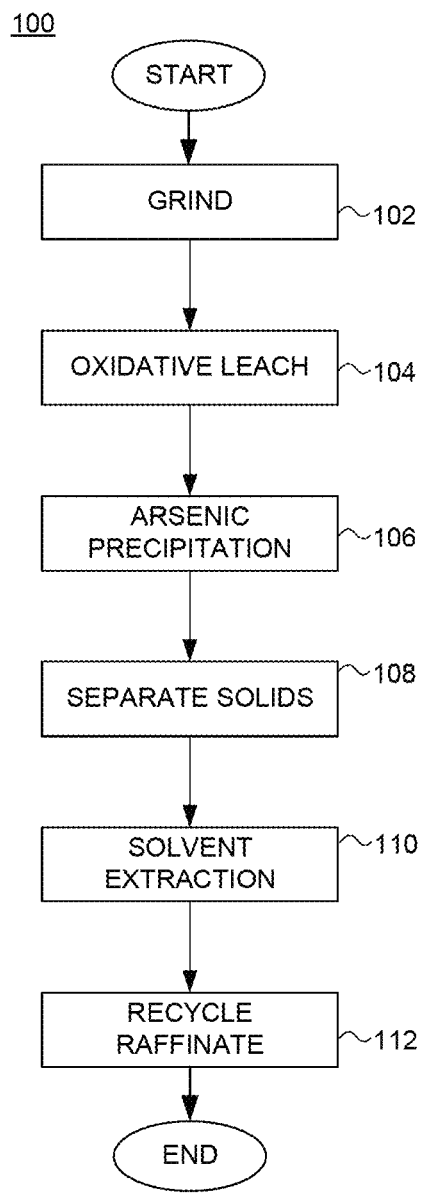
FIG. 1 is a simplified flow chart illustrating a process for extraction of copper from arsenical copper sulfide concentrate according to the present application.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to a process for extraction of copper from an arsenical copper sulfide concentrate is provided. The process includes atmospheric oxidative leaching of a feed slurry including the arsenical copper sulfide concentrate and an acidic iron sulfate-containing leach solution, in the presence of oxygen, to produce a leach slurry including copper and arsenic dissolved into the leach solution. After dissolving the copper and arsenic, and before precipitating the arsenic dissolved during the oxidative leaching, pre-precipitation solids are recovered from the leach slurry to produce the pre-precipitation solids and a resulting pregnant leach solution including the copper and arsenic. Scorodite-containing seed is introduced to the pregnant leach solution including the copper and arsenic to induce precipitation of the arsenic dissolved during the oxidative leaching, as scorodite. Solids are recovered from the pregnant leach solution to produce the solids, including the scorodite, and an arsenic-reduced pregnant leach solution including the copper. The arsenic-reduced pregnant leach solution including the copper is subjected to solvent extraction for recovering copper and thereby producing a raffinate including sulfuric acid and iron sulfate, and at least a portion of the raffinate including the sulfuric acid and iron sulfate is recycled to the oxidative leaching.

The arsenical copper concentrate may have, for example, a mineralogical composition of about 30% to about 60% enargite or tennantite and about 30% to about 50% pyrite and a chemical composition of 15 weight % to 30 weight % Cu, 15 weight % to 30 weight % Fe, 5 weight % to 15 weight % As, 30 weight % to 40 weight % total S and 0.1 weight % to 2.0 weight % Zn.

Reference is first made to FIG. 1, which is a flow chart illustrating a process for extraction of copper from arsenical copper sulfide concentrate, and indicated generally by the numeral 100. The process may contain additional or fewer operations than shown and described, and parts of the process may be performed in a different order than that shown and described herein.

The process is carried out to extract copper from arsenical copper sulfide concentrates containing minerals such as enargite and/or tennantite as well as iron sulfides, such as pyrite, and to reject the arsenic as scorodite, a crystalline form of ferric arsenate, $FeAsO_4.2H_2O$. The process is based upon ferric leaching in an acidic medium, e.g., an acidic ferric sulfate medium, in the presence of an oxygen-containing gas, with or without addition of a carbonaceous catalyst.

Arsenical copper concentrate is reground at 102 to facilitate copper extraction during leaching. The arsenical copper concentrate may be ground to a size ($P_{80}$) of the order of about 20 μm.

The reground arsenical copper concentrate is mixed with an acidic iron sulfate-containing leach solution and subjected to oxidative leaching at a temperature of about 80° C. to about 95° C. at 104 to provide a leach slurry in which the copper and arsenic are dissolved into the leach solution. A fine carbonaceous catalyst may optionally be added to improve copper dissolution. The iron concentration is maintained at about 15 g/L or higher during oxidative leaching, which is controlled by the degree of pyrite oxidation and by the prevailing acidity during leaching. Thus, a sufficient quantity of pyrite is oxidized during leaching to provide the ferric ions. The ferric ions promote leaching of the sulfide minerals and some of the ferric ions are also utilized in the scorodite precipitation that follows leaching. The oxidation of iron-containing minerals such as pyrite may be controlled, for example, to achieve a molar soluble ferric ion to soluble arsenic ratio of about 1:1 or greater in the leach slurry prior to precipitation of arsenic as scorodite. Optionally, the sulfate leach solution may also contain chloride ions.

After dissolving copper and arsenic, a scorodite-containing seed material is introduced to the leach slurry at 106 to promote the precipitation of the arsenic dissolved during oxidative leaching. Thus, arsenic precipitation is induced by the addition of scorodite-containing seed to the slurry after the majority of the extractable copper is dissolved. The temperature for scorodite precipitation is controlled between about 90° C. and the boiling point of the solution, for example, about 95° C. The scorodite precipitation is carried out without any prior liquid/solid separation. Optionally, the scorodite precipitation may be carried out without acid neutralization or pH adjustment.

After scorodite precipitation, the scorodite is separated from a remainder of the slurry at 108. The slurry containing the copper in solution and the majority of the arsenic in the form of scorodite, may be subjected to flotation where the un-reacted sulfides and elemental sulfur are recovered in a concentrate, and the scorodite reports predominantly to the tailings. Both flotation products are subjected to liquid/solid separation to provide a pregnant leach solution. A major portion of the tailings is utilized as the scorodite-containing seed utilized at 106. Alternatively, the leach slurry may be directly subjected to a liquid/solid separation, without prior flotation, and then, the resulting solids subjected to flotation for separation of the un-reacted sulfides and elemental sulfur away from scorodite, at least a portion of which is utilized as the scorodite-containing seed at 106.

The pregnant leach solution recovered from the liquid/solid separation is clarified and sent to a copper solvent extraction and electrowinning circuit at 110, where copper cathodes are produced.

The raffinate from the copper solvent extraction, which includes a majority of the soluble iron and sulfuric acid is recycled at 112, from the solvent extraction to the oxidative leaching at 104. Thus, the raffinate provides soluble iron and the acid utilized in the leaching process.

Utilizing the present process, copper is extracted into solution from an arsenical copper concentrate to levels of about 95% or greater. Most of the arsenic is co-extracted during oxidative leaching and then precipitated as scorodite by seed addition after the oxidative leaching is near completion, i.e., 95% or greater extraction of copper, without prior solid-liquid separation.

Figure 2:
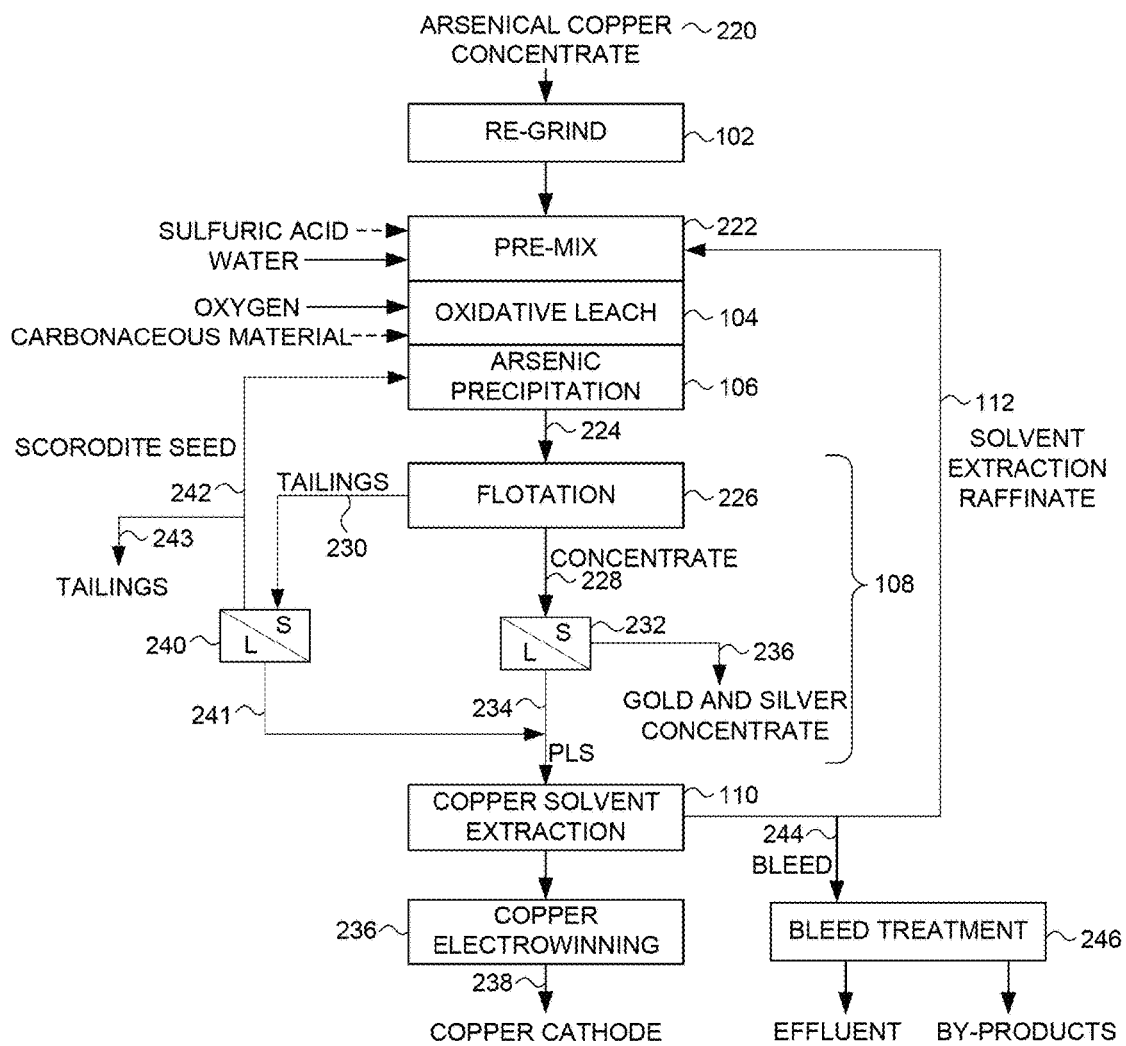
FIG. 2 is a simplified process flow diagram illustrating a process for extraction of copper from arsenical copper sulfide concentrate according to an embodiment.

Reference is now made to FIG. 2 to describe a process for extraction of copper from arsenical copper sulfide concentrate according to an embodiment. The process may contain additional or fewer operations than shown and described, and parts of the process may be performed in a different order.

As indicated above with reference to FIG. 1, a hydrometallurgical process is carried out to dissolve copper from arsenical copper concentrates. The arsenical copper concentrate 220 may be, for example, concentrate containing enargite and/or tennantite, and also contains pyrite.

The arsenical copper concentrate is reground at 102 to facilitate copper extraction during leaching. Finer grinding generally improves leaching kinetics, but at the cost of additional energy for such grinding. The arsenical copper concentrate may be subjected to, for example, a re-grind to achieve a particle size distribution $P_{80}$ of about 15 to about 25 μm, to expose further mineral surfaces and thereby improve the leaching rates of the contained copper minerals, including enargite, chalcopyrite, and tennantite, as well as that of pyrite.

Following regrinding, the concentrate is thickened to produce an underflow of at least about 50% solids, which is sent to pre-mixing at 222. Pre-mixing may be carried out in a pre-mix tank. In the pre-mixing, the arsenical copper concentrate is blended with a quantity of raffinate from copper solvent extraction. The raffinate includes an iron concentration at 15 g/L or greater and the sulfuric acid concentration at about 30 g/L to about 50 g/L, for example, 40 g/L to 50 g/L. Optionally, water is added and optionally, additional sulfuric acid. Alternatively part or all of the concentrate slurry and raffinate may be added directly to the first tank of a continuous oxidative leaching circuit.

Control of the iron and sulfuric acid concentrations facilitates starting and sustaining the leaching operation. The solids content of the slurry in pre-mixing is dependent on the copper grade of the concentrate. The solids content of the slurry in the pre-mix tank may be about 10% to about 30% solids. For example, the solids content of the slurry may be about 10% to about 15% solids by weight for treatment of high-grade concentrates. Higher solids content may be utilized when treating lower-grade arsenical copper concentrates or ores.

The oxidative leaching 104 and arsenic precipitation 106 operations may include a plurality of continuous stirred-tank reactors arranged in series. A carbonaceous catalyst may optionally be introduced to the slurry fed to the oxidative leaching. The carbonaceous catalyst is sized to maintain the catalyst in suspension in the slurry of about 10% to about 15% solids by weight, but with low loss and carry-over from the reactors, as well as to facilitate recovery of the carbonaceous catalyst that is lost from the reactors, utilizing a screen and recirculation. For example, fine carbonaceous catalyst of 300 μm may be present at a concentration in the slurry of about 10 g/L to about 50 g/L. Depleted catalyst may be replaced with additional carbonaceous catalyst in the process.

During leaching at 104, reaction of the copper minerals with ferric sulfate and sulfuric acid generates copper sulfate ($CuSO_4$), arsenic acid ($H_3AsO_4$) and ferrous sulfate ($FeSO_4$) in solution, as well as solid elemental sulfur ($S°$). An oxygen-containing gas is introduced for re-oxidation of ferrous to ferric ions. Elemental sulfur produced during leaching may form a passivation layer on partially leached sulfide particles, which slows the copper dissolution kinetics over time. The addition of carbonaceous material acts as a catalyst that increases the copper dissolution kinetics in the system.

The oxygen-containing gas may be oxygen-enriched air or air that is utilized to facilitate leaching of the copper-containing minerals and the ferrous oxidation to ferric during leaching. Some of the pyrite in the feed concentrate is oxidized to produce a sufficient concentration of ferric ions together with the iron from the recycled solvent extraction raffinate for scorodite precipitation. The oxidation conditions are controlled for copper and arsenic dissolution during the oxidative leaching and, subsequently, the arsenic removal as scorodite during arsenic precipitation at 106.

The temperature is maintained above about 80° C., preferably, in the range of about 85° C. to about 95° C., to achieve suitable copper leaching rates from arsenical copper concentrates.

Initially during leaching, the ferric ion concentration decreases as a result of rapid copper sulfide leach kinetics. Later in leaching, the total iron and ferric concentrations in solution increase as a result of leaching of the more refractory pyrite. The levels of pyrite oxidation during leaching are controlled such that the ferric ion concentration is not only sufficient to accomplish leaching of the copper minerals during oxidative leaching at 104 and precipitation of a majority of the dissolved arsenic as scorodite at 106, but also to retain a sufficiently high ferric ion concentration in the resulting pregnant leach solution and solvent extraction raffinate, which is recycled to leaching. Thus, the composition of the leach solution is controlled by controlling the extent of oxidation during oxidative leaching to control sulfuric acid content and soluble iron concentrations for copper dissolution and subsequent arsenic precipitation. The oxidation-reduction potential level (ORP) is controlled throughout the process, starting from about 450 mV to about 520 mV when measured against an Ag/AgCl reference electrode.

The solvent extraction raffinate recycled to leaching includes ferric iron concentration of at least about 10 g/L, for example, in the range of about 10 g/L to about 20 g/L. The pyrite oxidation during leaching is controlled to produce ferric ion concentrations of about 15 g/L to about 25 g/L before arsenic precipitation. The free acid concentration decreases from about 40 g/L to about 15 g/L during the leaching process. With the decrease in free acid concentration, the copper dissolution is at or above 95%, with copper solution tenors of about 20 g/L to 25 g/L and arsenic tenors of about 5 g/L to 11 g/L.

In addition to providing soluble iron, the oxidation of the pyrite also generates sulfuric acid, which assists in keeping the dissolved arsenic in solution during the oxidative leaching phase until the arsenic precipitation. Furthermore, the oxidation of pyrite provides a sufficiently high soluble iron to soluble arsenic ratio in solution for the precipitation of arsenic as scorodite, without the requirement of external iron addition to either the oxidative leach or the arsenic precipitation.

Many reactions take place during the oxidative leaching of arsenical copper concentrates in acidic ferric sulfate solution. The chemical reactions shown below are for illustrative purposes only and are not complete. Many of the reactions are exothermic, which facilitates attaining and maintaining the desired reaction temperatures.

The enargite reactions may include, for example, the following:

$$2Cu_3AsS_4 + 11Fe_2(SO_4)_3 + 8H_2O \rightarrow 6CuSO_4 + 2H_3AsO_4 + 22FeSO_4 + 8S° + 5H_2SO_4 \quad (1)$$

$$2Cu_3AsS_4 + 6H_2SO_4 + 5.5 O_2 \rightarrow 6CuSO_4 + 2H_3AsO_4 + 8S° + 3H_2O \quad (2)$$

The pyrite reactions may include, for example, the following:

$$FeS_2 + H_2SO_4 + 0.5 O_2 \rightarrow FeSO_4 + 2S° + H_2O \quad (3)$$

$$FeS_2 + H_2O + 3.5 O_2 \rightarrow FeSO_4 + H_2SO_4 \quad (4)$$

The ferrous oxidation reaction may be represented as:

$$2FeSO_4 + H_2SO_4 + 0.5 O_2 \rightarrow Fe_2(SO_4)_3 + H_2O \quad (5)$$

The scorodite precipitation reaction may be represented as:

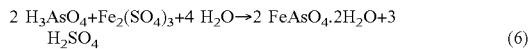

$$2\ H_3AsO_4 + Fe_2(SO_4)_3 + 4\ H_2O \rightarrow 2\ FeAsO_4 \cdot 2H_2O + 3\ H_2SO_4 \quad (6)$$

After dissolving the majority of the copper and the arsenic into the leach solution during oxidative leaching, arsenic precipitation is induced at 106 by introducing scorodite to the leach slurry by seeding with scorodite-enriched tailings obtained by flotation of the final leach residue, or by using the scorodite-containing final leach residue. The scorodite seed may be introduced after dissolving at least about 75% of the copper. For example, the scorodite seed may be introduced after dissolving about 95% of the copper or greater. The temperature for the scorodite precipitation may be about 90° C. or higher. For example, the temperature may be maintained in a range of about 90° C. to about 100° C. Seeding with scorodite is carried out after the copper dissolution is very close to complete, there is no acid neutralization or pH adjustment carried out. By seeding after copper dissolution is close to complete and not adjusting the pH or acid neutralization, copper losses due to co-precipitation are small, and separation of un-reacted sulfides plus elemental sulfur from scorodite by flotation is facilitated. The residence time for arsenic precipitation varies with temperature, free acid concentration, as well as the quantity and surface area (particle size) of the scorodite seed introduced.

Although scorodite may be precipitated at slightly lower temperatures, a temperature of about 95° C. may be utilized to precipitate coarse scorodite. The inventors of the present application found that a seed recycle ratio of at least 2:1, and preferably about 3:1 to about 6:1, mass of arsenic in the seed to the mass of arsenic in solution, is useful to induce rapid arsenic precipitation as scorodite. Lower free acid concentrations promote more rapid and complete arsenic precipitation.

The extent of arsenic precipitation substantially matches the quantity of arsenic leached from the concentrate in oxidative leaching. Depending on the concentrate composition, the solids content of the slurry during leaching and the quantity of arsenic that re-circulates with solvent extraction raffinate, the process may be successfully implemented with about 50% or higher precipitation of the arsenic in the leach solution.

In the present embodiment, the post-precipitation leach slurry 224 is subjected to flotation at 226. Thus, the post-precipitation leach slurry 224 is cooled and is directly subjected to flotation at 226, without prior solid-liquid separation. The flotation produces a concentrate 228 containing un-reacted sulfides, elemental sulfur and most of the precious metals, as well as flotation tailings 230 including the scorodite and gangue minerals. The scorodite content of the flotation tailings 230 may be as high as about 80%, depending on the feed concentrate composition. Both flotation products are subjected to liquid/solid separation, for example, by thickening and/or filtration. Thus, the concentrate 228 is subjected to liquid/solid separation at 232.

The thickened flotation concentrate solids from the liquid/solid separation at 232 are washed and directed for further treatment to recover valuable metals such as gold and silver.

As indicated, the flotation tailings 230 are also subjected to liquid/solid separation at 240. A portion of the solids 242 produced from the liquid/solid separation at 240 is recycled as seed for scorodite precipitation. The remainder 243 is washed and removed from the process for safe disposal. Recirculation of the scorodite-containing tailings to the arsenic precipitation is maintained at the recommended weight ratio range of about 3 to 6 parts of As contained in the scorodite recycle per part of dissolved As in solution, i.e., a recycle ratio between about 3:1 and 6:1.

The resulting pregnant leach solution 234 from the liquid solid separation and the solution 241 from the liquid/solid separation at 240 is sent to copper recovery by solvent extraction 110 and electro-winning to produce the copper cathodes 238.

The pregnant leach solution 234, which contains about 20 g/L to about 40 g/L of copper, about 1 g/L to about 4 g/L of arsenic, and about 25 g/L to about 35 g/L of iron, is processed by conventional copper solvent extraction and electro-winning. The solvent extraction circuit at 110 may include a primary and a secondary copper solvent extraction circuit. A major portion of the raffinate from the primary copper solvent extraction circuit is re-circulated to the leach to provide a majority of the ferric and acid for leaching. The recycle of the raffinate from the primary copper solvent extract circuit may be to the pre-mixing at 222. Alternatively, the solvent extraction raffinate from the primary copper solvent extraction may be recycled into the oxidative leaching at 104. The above-described process does not require additional sources of acid or ferric ion.

During solvent extraction at 110, the pregnant leach solution 234 enters the primary solvent extraction circuit, where the pregnant leach solution 234 is mixed with the organic phase containing an oxime extractant, and copper is extracted into the organic phase. From about 60% to about 90% of the solvent extraction raffinate is recycled at 112 to the pre-mixing at 222, the pre-mix tank, to provide the sulphuric acid and much of the iron utilized for oxidative leaching and arsenic precipitation. The recycling of the solvent extraction raffinate is a source of soluble iron in the leach solution. The copper-loaded organic phase is stripped with spent electrolyte originating from copper electro-winning, and the resulting copper-rich solution is sent to the electro-winning circuit for electrowinning at 236 to recover of the dissolved Cu values as copper cathodes 238.

The acid in the remaining portion of the solvent extraction raffinate, which is not recycled to the pre-mixing 222, is partially neutralized and, after solids removal by filtration, is directed to a secondary copper solvent extraction to reduce the copper concentration below about 1 g/L, thus enhancing recovery of the remaining copper without substantial loss of soluble iron. A portion of the secondary copper solvent extraction raffinate is also re-circulated to provide more soluble iron and acid for copper leaching. The balance of the secondary copper solvent extraction raffinate is directed to a bleed treatment to recover residual metal values and to control the concentrations of impurity elements. Hence, the majority of solution utilized in and arising from the process is recycled.

The bleed treatment depends on the types and concentrations of impurity elements that dissolve from the arsenical copper concentrate during leaching. The bleed treatment includes neutralization, precipitation and/or other selective separation stages for the removal, recycle and/or recovery of specific elements. Hydrogen sulfide may be one of the reagents utilized. A portion of the final effluent from the bleed treatment 246 may be recycled as make-up or wash water in the process, and the remainder may be disposed of in accordance with applicable environmental regulations.

Figure 3:
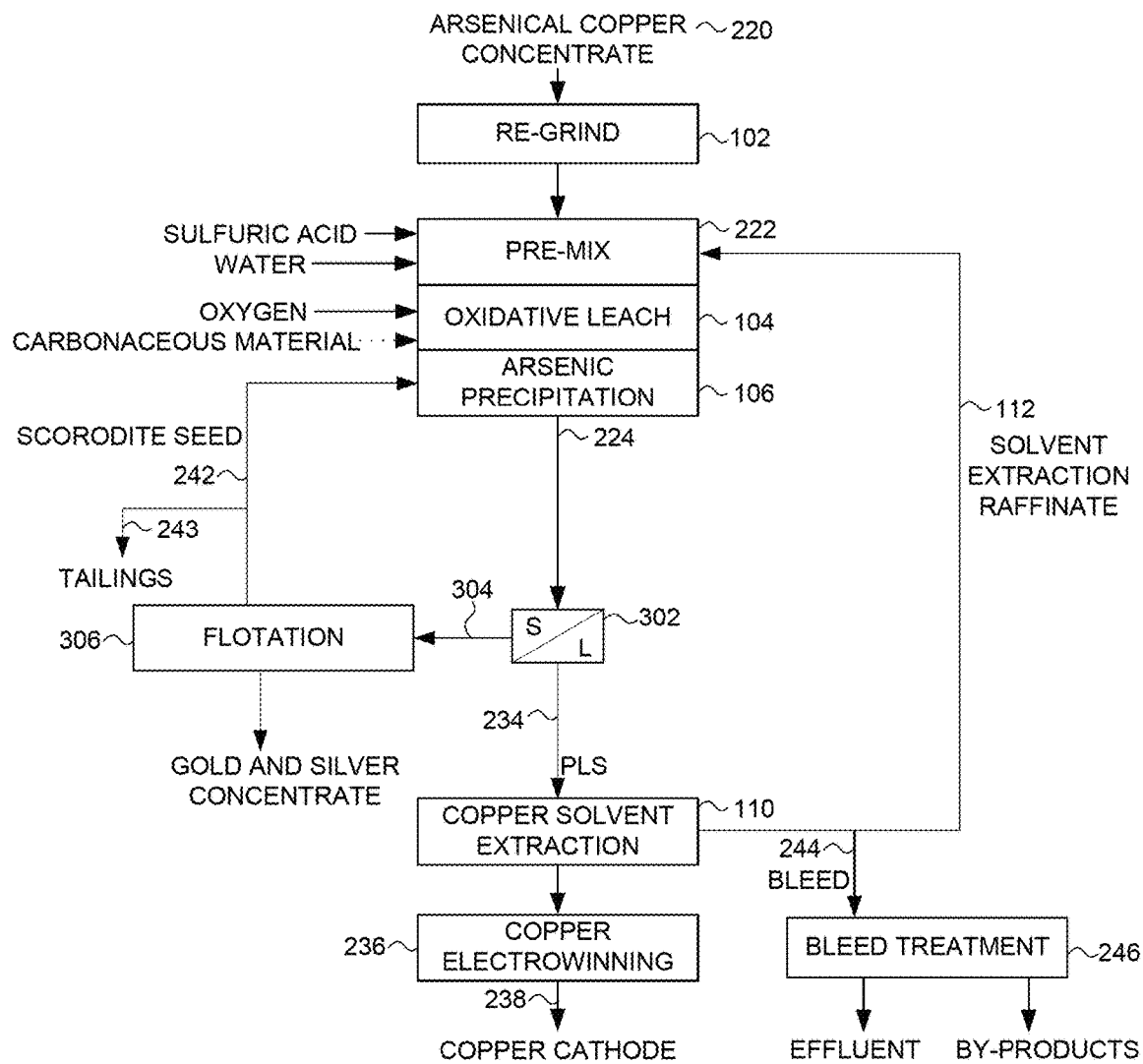
FIG. 3 is a simplified process flow diagram illustrating another process for extraction of copper from arsenical copper sulfide concentrate according to an embodiment.

Reference is now made to FIG. 3 to describe a process for extraction of copper from arsenical copper sulfide concentrate according to another embodiment. The process may contain additional or fewer operations than shown and described, and parts of the process may be performed in a different order.

The process shown in FIG. 3 includes many similar operations to those shown in FIG. 2 and described in detail above. Those operations are not described again herein in detail to avoid obscuring the description.

The process shown in FIG. 3 includes re-grinding 102 of the arsenical copper concentrate 220, pre-mixing 222, oxidative leaching 104 and arsenic precipitation 106, as described above with reference to FIG. 2. In the present example, however, the post-arsenic precipitation leach slurry 224 is subjected to liquid/solid separation 302, which may include thickening and/or filtration processes to produce the pregnant leach solution 234, which is sent to copper recovery by solvent extraction 220 and electro-winning 236. The solids 304 from the liquid/solid separation at 302, are then treated by flotation at 306 to produce a sulfur-sulfide concentrate and scorodite-rich tailings. Thus, the scorodite-containing seed is produced from the flotation at 306.

The flotation products, including the scorodite-rich tailings and concentrate are subjected to liquid/solid separation. The tailings may be disposed of, as described above and the products are used or treated as described above. A concentrate including most of the precious metals is also produced, as described above.

Figure 4:
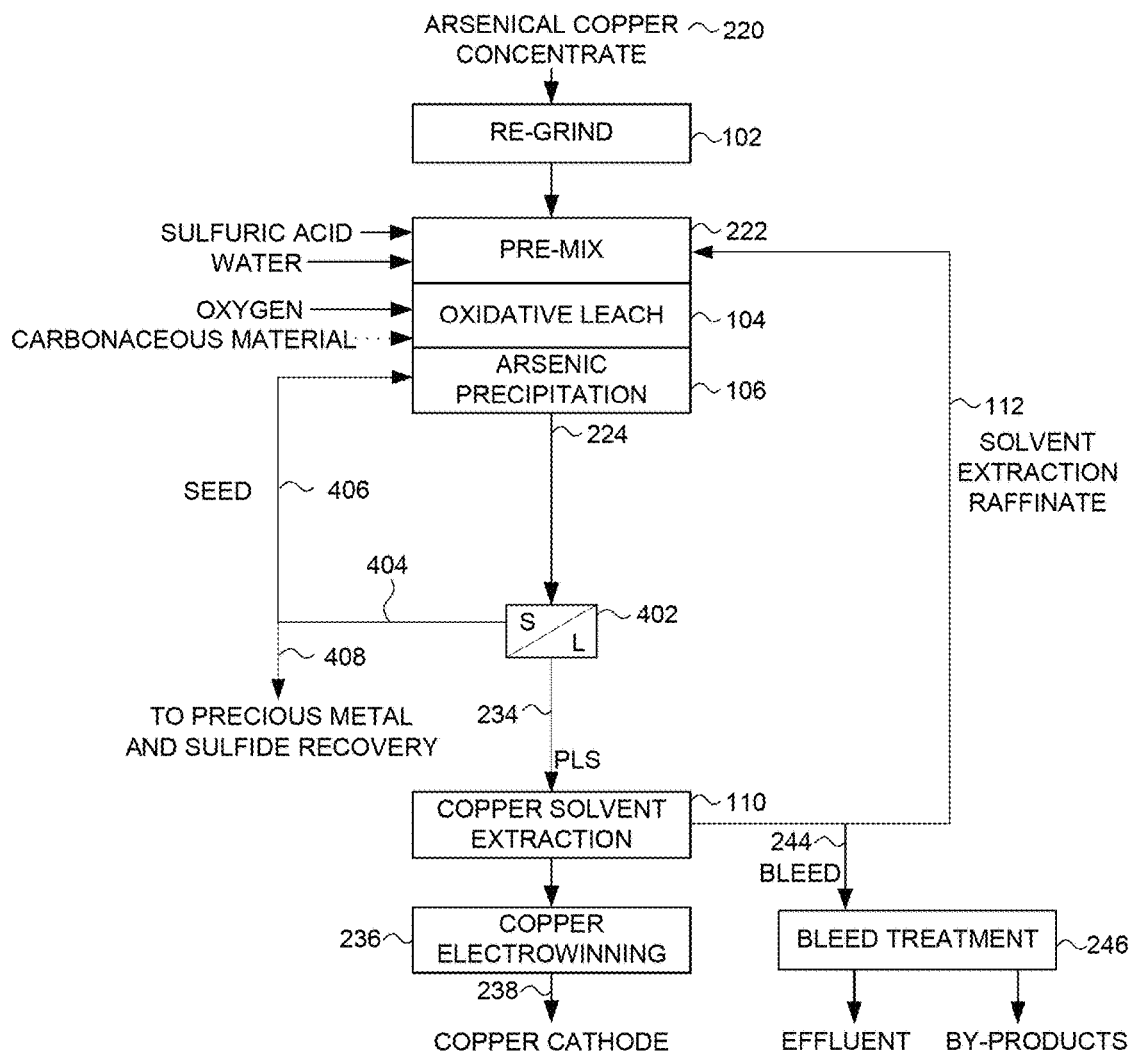
FIG. 4 is a simplified process flow diagram illustrating another process for extraction of copper from arsenical copper sulfide concentrate according to an embodiment.

Reference is now made to FIG. 4 to describe a process for extraction of copper from arsenical copper sulfide concentrate according to yet another embodiment. The process may contain additional or fewer operations than shown and described, and parts of the process may be performed in a different order.

The process shown in FIG. 4 includes many similar operations to those shown in FIG. 2 and described in detail above. Those operations are not described again herein in detail to avoid obscuring the description.

The process shown in FIG. 4 includes re-grinding 102 of the arsenical copper concentrate 220, pre-mixing 222, oxidative leaching 104 and arsenic precipitation 106, as described above with reference to FIG. 2. In the present example, however, the post-arsenic precipitation leach slurry 224 is subjected to liquid/solid separation 402 without prior flotation, which may include thickening and/or filtration processes to produce the pregnant leach solution 234, which is sent to copper recovery by solvent extraction 220 and electro-winning 236. The solids 404, which optionally may be washed, from the liquid/solid separation at 402, are scorodite-rich and a major portion of the solids 404 is directly utilized as the scorodite-containing seed 406. The remaining portion of the solids 408 is subjected to further treatment, such as flotation to reject arsenic and gangue for precious metal and sulfide recovery.

Surprisingly, by delaying the addition of scorodite-containing seed until after oxidative leaching is near complete, higher copper extractions are achieved than when the scorodite-containing seed is added at the start of leaching. In addition, arsenic precipitation after the majority of arsenical copper minerals are oxidized and the metals dissolved, produces scorodite with low entrainment of precious metals and un-reacted sulfides. The produced scorodite is subsequently more readily separated from elemental sulfur and un-reacted sulfides as well as the contained gold and silver by flotation.

In contrast, addition of scorodite-containing seed to the leach feed or early in oxidative leaching results in premature precipitation of a portion of the ferric iron as an arsenate, adversely affecting copper leach rates and resulting in lower copper extraction. The extent of arsenic precipitation as scorodite is enhanced by adding the scorodite-containing seed after oxidative leaching, when the solution contains a higher dissolved ferric to arsenic ratio as a result of pyrite oxidation. No oxygen addition is required in the arsenic precipitation in the present process. The arsenic precipitation is improved without oxygen addition, compared to arsenic precipitation with the addition of oxygen.

Figure 5:
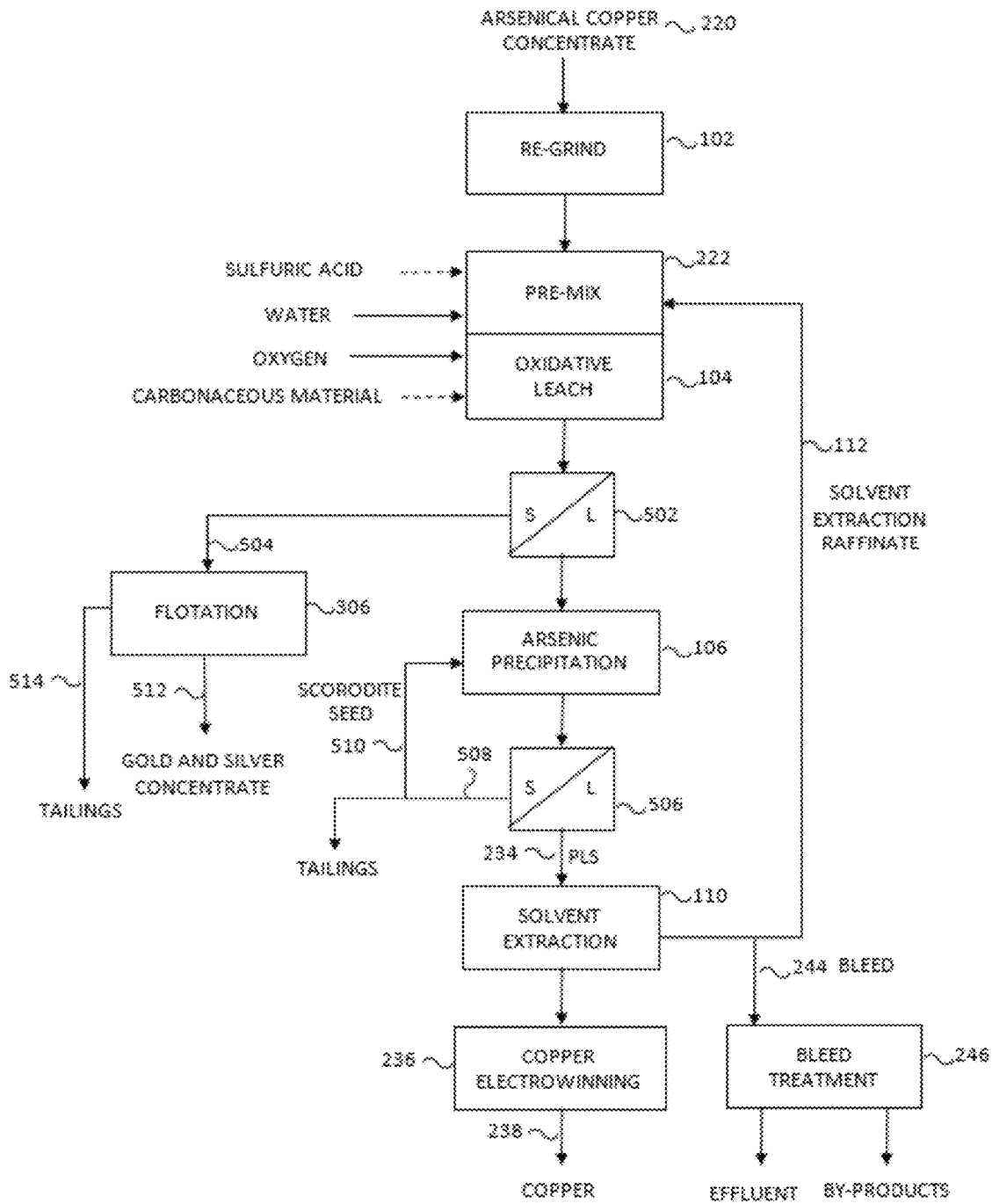
FIG. 5 is a simplified process flow diagram illustrating another process for extraction of copper from arsenical copper sulfide concentrate according to an embodiment.

Reference is now made to FIG. 5 to describe a process for extraction of copper from arsenical copper sulfide concentrate according to another embodiment. The process may contain additional or fewer operations than shown and described, and parts of the process may be performed in a different order.

The process shown in FIG. 5 includes many similar operations to those shown in FIG. 3 and described in detail above. Those operations are not described again herein in detail to avoid obscuring the description.

The process shown in FIG. 5 includes re-grinding 102 of the arsenical copper concentrate 220, pre-mixing 222, oxidative leaching 104 and arsenic precipitation 106, as described above with reference to FIG. 3. In the present example, however, the post-oxidative leach is subjected to liquid/solid separation 502, which may include thickening and/or filtration processes to produce the pregnant leach solution, which is sent to arsenic precipitation 106. Liquid/solid separation 502 may include washing at least some of the separated solids and combining the washing liquor with the pregnant leach solution that is sent to arsenic precipitation 106. The pre-precipitation solids 504 from the liquid/solid separation at 502 are then treated by flotation at 306 to produce a sulfur-sulfide concentrate and pyrite-rich tailings. Then, the slurry from arsenic precipitation is sent to liquid/solid separation 506 which may be include thickening and/or filtration processes to produce the pregnant leach solution 234; which is sent to copper recovery by solvent extraction 110 and electro-winning 236. Thus, the solids 508 from the liquid/solid separation at 506 are scorodite-rich and a major portion of the solids 508 is directly utilized as the scorodite-containing seed 510. The remaining portion of the solids 508 is washed and removed from the process for safe disposal.

The liquid/solid separation 502 may remove at least 90 wt % of the solids present in the post-oxidative leach. In some exemplary processes, the separation may remove at least 95 wt %, 99 wt %, or substantially all the solids present in the post-oxidative leach. Although the liquid/solid separation may remove enough solids from the post-oxidative leach that the resulting leach solution is no longer a slurry, it should be understood that the leach solution is subsequently processed in a similar manner to a post-oxidative leach slurry that has not been subjected to liquid/solid separation. Accordingly, the leach solution may still be referred to as "the leach slurry".

Subjecting the post-oxidative leach to the liquid/solid separation prior to the arsenic precipitation may remove at least some contaminants from the leach slurry and result in a scorodite-rich solid product that is cleaner than the scorodite-rich solid product produced without the liquid/solid separation.

In a process without the liquid/solid separation prior to the arsenic precipitation, at least some precious metals may be lost in one or more separations, such as in a post arsenic-precipitation floatation where both precious metals and solid scorodite are separated from the pregnant leach solution. Subjecting the post-oxidative leach to the liquid/solid separation prior to the arsenic precipitation may reduce overall losses of precious metals by separating the precious metals from the scorodite before the scorodite is precipitated. Rather, the precious metals are removed in the pre-precipitation solids.

The flotation products, including the pyrite-rich tailings 514 and gold and silver concentrate 512 are subjected to liquid/solid separation. The tailings may be disposed of, as described above and the products are used or treated as described above. A concentrate including most of the precious metals is also produced, as described above.

With this process, the scorodite produced in the arsenic precipitation 106 is more pure and all the precious metals are contained in the solid 504 from the liquid/solid separation at 502.

The following examples are submitted to further illustrate various embodiments of the present invention. These examples are intended to be illustrative only and are not intended to limit the scope of the present invention. The Examples referred to herein refer to scorodite, the presence of which was confirmed by scanning electron microscopy and x-ray diffraction methods.

EXAMPLE 1

Batch Leaching Without Scorodite Seed

Example 1 demonstrates that very high copper extraction percentages were obtained by oxidative leaching of arsenical copper sulfide concentrate.

An arsenical copper concentrate analyzing 26.3 wt. % Cu, 7.96 wt. % As, 19.4 wt. % Fe and 40 wt. % total S, and containing approximately 39% enargite, 7% collusite, 2% tennantite and 40% pyrite, was utilized as feed for large batch-scale oxidative leaching at atmospheric pressure. Arsenic precipitation as scorodite was not carried out in these tests. About 2.7 m$^3$ of an acidic iron sulfate solution, containing about 40 g/L H$_2$SO$_4$ and 19 g/L to 25 g/L Fe (mostly as ferric) were utilized for Example 1, as well as 230 kg of concentrate and 20 g/L to 40 g/L fine carbonaceous catalyst. The leaching vessel was mechanically agitated, and oxygen was sparged into the leaching vessel. The leach temperature was controlled at 85° C. to 90° C.

The copper extractions obtained are shown in Table 1. No attempt was made to precipitate the arsenic by addition of a scorodite-containing seed material either at the beginning or later during or after leaching. As a result, most of the arsenic was co-extracted with the copper.

TABLE 1

Arsenical Copper Concentrate Leaching without Arsenic Precipitation

| Avg. Temp. (° C.) | Time (h) | Feed Solution Analysis (g/L) | | | PLS Analysis (g/L) | | | Extraction (%) | |
|---|---|---|---|---|---|---|---|---|---|
| | | Fe$^{3+}$ | Fe$^{2+}$ | H$_2$SO$_4$ | Cu | As | H$_2$SO$_4$ | Cu | As |
| 89 | 56 | 23.4 | 1.5 | 40 | 22.6 | 6.3 | 19 | 98.1 | 81 |
| 88 | 80 | 17.1 | 1.5 | 41 | 28.0 | 8.8 | 25 | 98.0 | 78 |

Conclusion

A very high percentage of copper, of 98% or greater, was dissolved during oxidative leaching.

EXAMPLE 2

Batch Leaching With Small Recycle of Residue as Seed to Leach Feed

Example 2 demonstrates that very high copper extractions were obtained by oxidative leaching of arsenical copper sulfide concentrate.

An arsenical copper concentrate analyzing 26.3 wt. % Cu, 7.96 wt. % As, 19.4 wt. % Fe and 40 wt. % total S, and containing approximately 39% enargite, 7% collusite, 2% tennantite and 40% pyrite, was utilized as feed for large batch pilot-plant scale oxidative leach testing. 260 kg of the arsenical copper concentrate was leached in each of the tests of Example 2.

The leaching conditions were similar to those utilized in Example 1. The leach time was 80 hours with oxygen sparging. The temperature was about 88° C. in both tests.

Leach residue containing at least some scorodite from prior experiments was added to the leach feed. 1.1 and 1.0 kg of leach residue per kg of copper concentrate in these tests. The leach residue utilized as recycle seed material analyzed 2.8 wt. % Cu, 18.4 wt. % Fe, and 2.4 wt. % As.

The copper extraction is shown in Table 2.

TABLE 2

Batch Oxidative Leaching with Leach Residue Recycle to the Leach Feed

| Leach Res. Addn. | Feed Solution Analysis (g/L) | | | PLS Analysis (g/L) | | | Extraction (%) | |
|---|---|---|---|---|---|---|---|---|
| kg/kg Conc. | Fe$^{3+}$ | Fe$^{2+}$ | H$_2$SO$_4$ | Cu | As | H$_2$SO$_4$ | Cu | As |
| 1.0 | 20.2 | 5.0 | 43 | 33.2 | 9.4 | 24 | 96.5 | 75 |
| 1.1 | 19.3 | 1.9 | 40 | 24.2 | 5.4 | 10 | 95.6 | 60.8 |

The percentage of copper dissolved during oxidative pressure leaching decreased in Example 2, from about 98% to about 96%. The addition of scorodite-containing leach residue was insufficient to promote the precipitation of significant quantities of the arsenic co-extracted during oxidative leaching. The arsenic concentrations in solution were of the same order as those experienced in Example 1, being mainly a function of dilution and the free acid concentration.

Conclusion

The percentage of copper dissolved during oxidative pressure leaching was about 96% in the presence of scorodite-containing residue of insufficient quantity to cause precipitation of significant amounts of the arsenic.

EXAMPLE 3

Batch Leaching With Higher Recycle of Scorodite to Leach Feed

Example 3 demonstrates the effect of increasing quantities of scorodite-containing leach residue added to the leach feed slurry to precipitate arsenic as scorodite and thus decrease the amount of arsenic in the leach solution.

An arsenical copper concentrate analyzing 26.3 wt. % Cu, 7.96 wt. % As, 19.4 wt. % Fe and 40 wt. % total S, containing approximately 39% enargite, 7% collusite, 2% tennantite and 40% pyrite, was utilized as feed for large scale batch oxidative leaching. 260 kg of the arsenical copper concentrate was leached in each of the tests.

The leaching conditions were similar to those utilized in Examples 1 and 2. The leach time was 80 hours with oxygen sparging. The temperature was in the 87° C. to 88° C. range on average.

Scorodite-containing leach residue from prior experiments was added to the leach feed. From 2.9 up to 3.5 kg of leach residue per kg of copper concentrate was added. The leach residues utilized as scorodite seed analyzed, on average, 0.81 wt. % Cu, 15.7 wt. % Fe, S and 8.7 wt. % As, containing an estimated 26.8 wt. % scorodite.

The leaching time was 72 hours for the tests labelled 10 and 11 and 80 hours for the tests labelled 13 and 15, with oxygen sparging.

TABLE 3

Batch Leaching with increased Leach Residue Recycle to the Leach Feed

| Test No. | Avg. Temp. (° C.) | Leach Res. Addn. kg/kg Conc. | Feed Solution Analysis (g/L) | | | PLS Analysis (g/L) | | | Extraction (%) Cu |
|---|---|---|---|---|---|---|---|---|---|
| | | | $Fe^{3+}$ | $Fe^{2+}$ | $H_2SO_4$ | Cu | As | $H_2SO_4$ | |
| 13 | 87 | 2.9 | 13.1 | 10.6 | 39 | 46.3 | 1.1 | 39 | 91.6 |
| 11 | 88 | 3.0 | 19.4 | 7.5 | 43 | 50.6 | 1.1 | 46 | 90.3 |
| 10 | 87 | 3.5 | 13.4 | 9.5 | 48 | 40.0 | 1.0 | 31 | 88.2 |
| 15 | 88 | 3.5 | 10.0 | 13.7 | 43 | 41.3 | 1.1 | 33 | 86.8 |

The results in Table 3 clearly demonstrate that the increased recycle of scorodite-containing leach residue to the leach feed slurry lowered the arsenic concentration in the pregnant leach solution to 1.0 to 1.1 g/L. However, increasing the leach residue recirculation to the leach feed slurry also decreased the copper extraction significantly, from about 98% without leach residue recirculation to about 87.5% when 3.5 kg of scorodite-containing leach residue were added to the leach feed slurry per kg of arsenical copper concentrate.

Conclusion

Although appreciable arsenic was precipitated during the oxidative leach, much lower copper extraction values of between 86.8% and 91.6% were realized. Such extraction values are economically unattractive.

EXAMPLE 4

Batch Leaching With Delayed Addition of Scorodite, Bench-Scale Leach Tests

Example 4 demonstrates the effect of the delayed addition of scorodite-containing seed material until near the completion of oxidative leaching, on the copper extraction and arsenic precipitation as scorodite.

An arsenical copper concentrate analyzing 26.3 wt. % Cu, 7.96 wt. % As, 19.4 wt. % Fe and 40 wt. % total S, and containing approximately 39% enargite, 7% collusite, 2% tennantite and 40% pyrite, was utilized as feed for bench scale oxidative leaching in a mechanically agitated reactor of 4 L operating volume. The temperature of the reaction slurry was maintained between 85° C. and 90° C.

A synthetic solution containing 20 g/L of ferric ion as sulfate and 40 g/L of sulfuric acid was utilized and 300 g of concentrate plus fine carbonaceous catalyst were added to the solution to obtain feed slurries containing about 10% solids by weight. The oxygen flow was maintained to control the oxidation-reduction potential (ORP) value between 460 and 520 mV (vs. Ag/AgCl) during leaching.

When the copper extraction reached about 95%, a scorodite-containing seed, comprising leach residue from a prior experiment, was added to induce the precipitation of scorodite. The leach residue recycle solids were added not to the leach feed slurry, as was done in Examples 2 and 3, but after 40 to 50 hours of leaching instead. The scorodite recycle ratio was varied between about 3.5:1 and about 4.5:1.

Figure 6:
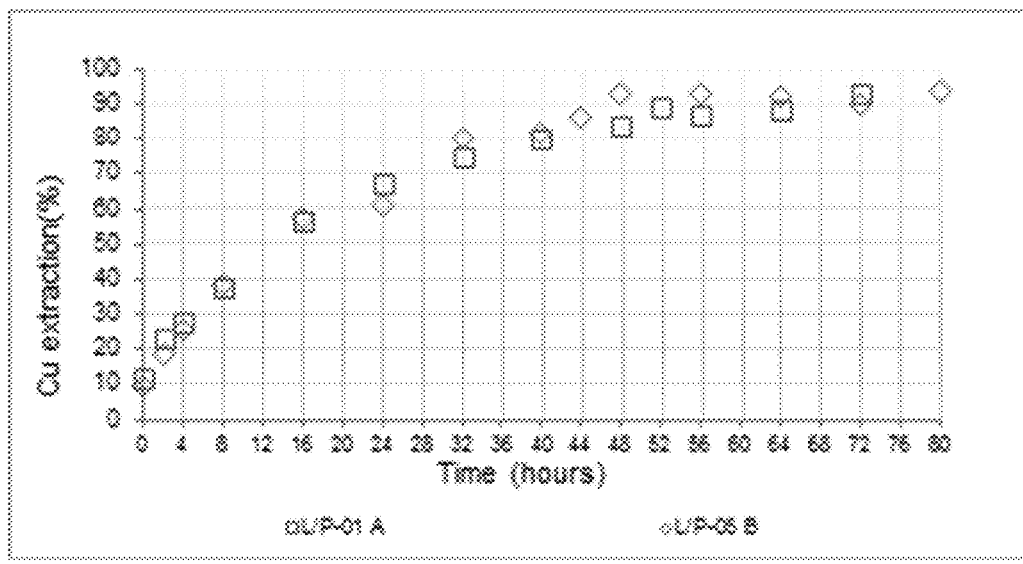
FIG. 6 is a graph showing copper extraction over time with oxidative batch leaching in a laboratory 4 L vessel.
Figure 7:
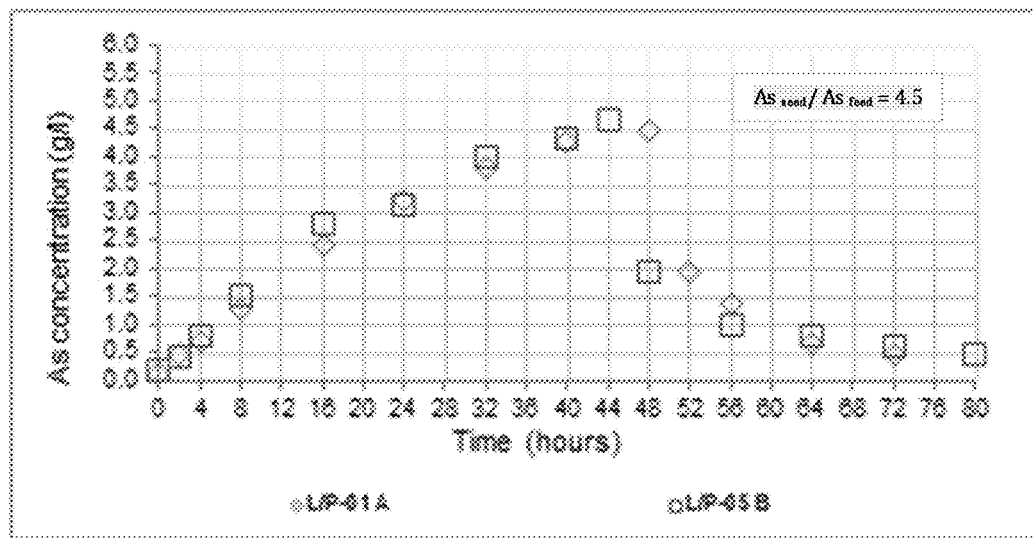
FIG. 7 is a graph showing arsenic concentration over time with oxidative batch leaching in a laboratory 4 L vessel.

The changes in copper extraction and arsenic concentration in solution over time are shown in FIG. 6 and FIG. 7, respectively. The final copper extractions ranged between 90 and 95% after 72-80 hours, while the arsenic concentrations increased to about 4.5 g/L after 40-48 hours of leaching prior to the addition of the scorodite seed, before declining to about 0.5 g/L after 72-80 hours of total time in oxidative leach and arsenic precipitation. The final acid concentrations were in the range of 20 g/L to 25 g/L. The degree of arsenic precipitation was in excess of 80%. The final leach residues contained about 60% scorodite, 7% elemental sulfur, 17% pyrite, 3% enargite and about 13% gangue minerals.

Conclusion

Adding scorodite-containing seed material near the completion of copper leaching, rather than at the beginning or at an early stage in leaching, results in high copper extractions and high degrees of arsenic precipitation as scorodite.

EXAMPLE 5

Batch Leaching with Delayed Scorodite Addition, Pilot Plant Scale Batch Tests

An arsenical copper concentrate containing 25.6 wt. % Cu, 7.25 wt. % As, 20.0 wt. % Fe, 40 wt. % total S and 1.85 wt. % Zn with an approximate mineralogical composition of 41 wt. % enargite, 6.5 wt. % collusite, 2.6 wt. % tennantite, 40 wt. % pyrite and 2.5 wt. % sphalerite was utilized. The batch leach tests were carried out in a large pilot plant scale reactor equipped with mechanical agitation and having an operating volume of about 3 m³. The leaching solution was prepared using solvent extraction raffinate containing 15 g/L to 20 g/L of $Fe^{3+}$ and about 40 g/L of sulfuric acid, as well as minor copper and arsenic.

Concentrate and fine carbonaceous catalyst were added to the leaching solution to obtain feed slurry densities of about 10% solids by weight. The reaction temperature was maintained between 85° C. and 90° C. and oxygen was provided during the initial 60 hours. The total process time, including oxidative leaching plus arsenic precipitation, was 80 hours. Synthetic scorodite was added as seed to the leached pulp following 60 hours of oxidative leaching. The temperature during arsenic precipitation was controlled at 92° C. to 95° C., and the scorodite recycle ratios, were 4.0:1 and 5.1:1 in Tests L/P-04 and L/P-02, respectively.

Figure 8:
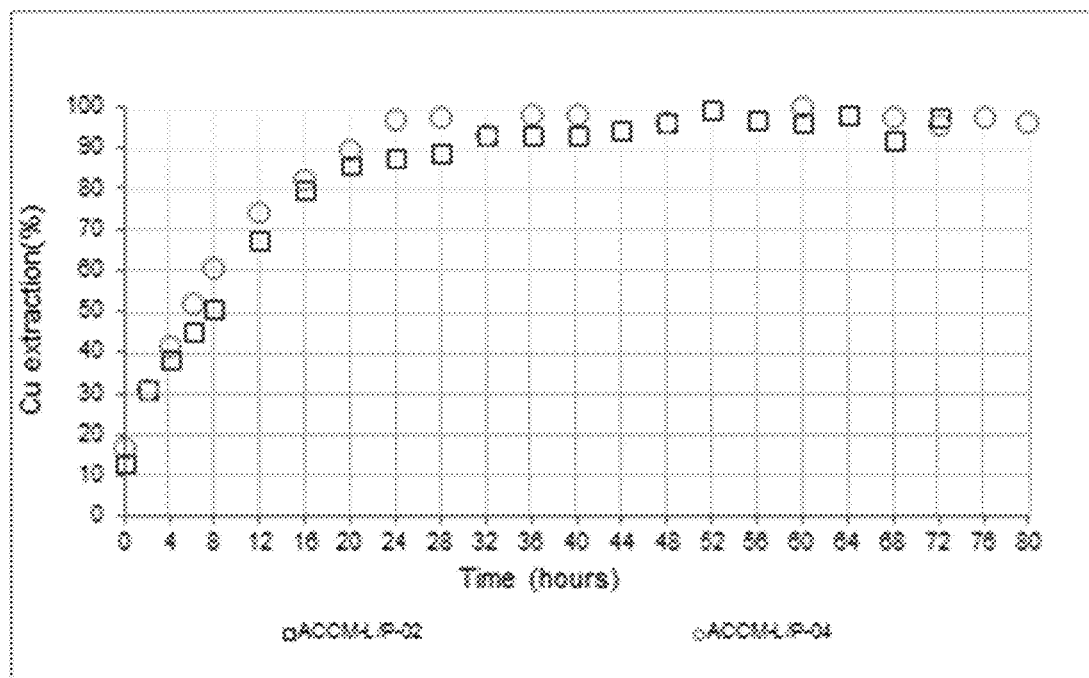
FIG. 8 is a graph showing copper extraction over time with batch oxidative leaching in a pilot-plant scale reactor having a 3 m³ operating volume.
Figure 9:
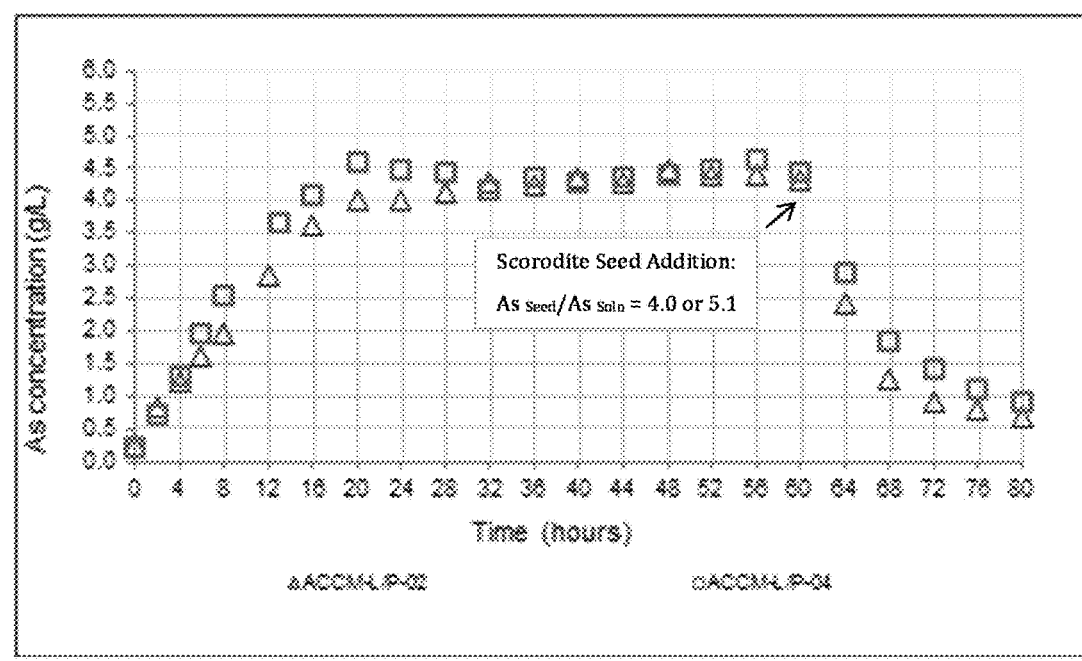
FIG. 9 is a graph showing arsenic concentration in solution over time with batch oxidative leaching in the pilot-plant scale reactor having a 3 m³ operating volume.

The changes in Cu extraction and As concentration over time are shown in FIG. 8 and FIG. 9, respectively. The final Cu extractions after the 80 hours were consistently 95% or higher. The arsenic concentrations increased to 4.0 to 5.5 g/L during the 60 hours of oxidative leaching, and then decreased steadily to less than 1.0 g/L during the following 20 hours after scorodite seed addition. Thus about 80% arsenic was precipitated from solution. The final leach residue comprised about 69% scorodite, 7% pyrite, 2% enargite, 6% elemental sulfur and 8% silica plus other minor compounds.

Conclusion

Effective copper extraction and arsenic precipitation as scorodite is achieved by adding scorodite-containing seed material for arsenic precipitation after oxidative leaching is near completion, i.e., when high copper extraction is already achieved, rather than at the beginning of leaching, as shown in Example 3. High final copper extractions are achieved when the scorodite-containing seed material is added after copper extractions in excess of about 90% are achieved.

EXAMPLE 6

Continuous Leaching and Precipitation in Pilot Plant

An arsenical copper concentrate containing 25.6 wt. % Cu, 7.25 wt. % As, 20.0 wt. % Fe, 40 wt. % total S and 1.85 wt. % Zn with an approximate mineralogical composition of 41 wt. % enargite, 6.5 wt. % collusite, 2.6 wt. % tennantite, 40 wt. % pyrite and 2.5 wt. % sphalerite was utilized. The campaign was carried out continuously, in a pilot plant over a total period of 150 days. The oxidative leach and arsenic precipitation operations were carried out in five stirred tanks of 6 m$^3$ operating volume, each connected in series. The temperature was controlled at 85° C. to 90° C. in the first four, oxidative leach reactors (Tanks 1 to 4), and at 92° C. to 95° C. in the final tank (Tank 5), which was utilized for arsenic precipitation. The total retention time in the continuous circuit was 80 hours.

The arsenical copper concentrate and recycled solvent extraction raffinate, containing 15 g/L of ferric ion and 40 g/L of sulfuric acid, were blended in a pre-mixing tank. The resulting feed slurry was continuously pumped into the first oxidative leach reactor. Oxygen was sparged into all four leach reactors to achieve oxidation-reduction potential (ORP) values between 460 mV and 520 mV (vs. Ag/AgCl) throughout the leach operations.

Scorodite-containing seed, having an average composition of 1.0 wt. % Cu, 19.4 wt. % Fe, and 15 wt. % As (containing an estimated 75% or greater scorodite) was pumped in slurry form into the final tank (Tank 5) to induce the precipitation of the dissolved arsenic values as scorodite. The scorodite recycle ratio, defined as the mass of As contained in the seed per mass of As in solution, was varied between about 3.5:1 and about 4.5:1.

Figure 10:
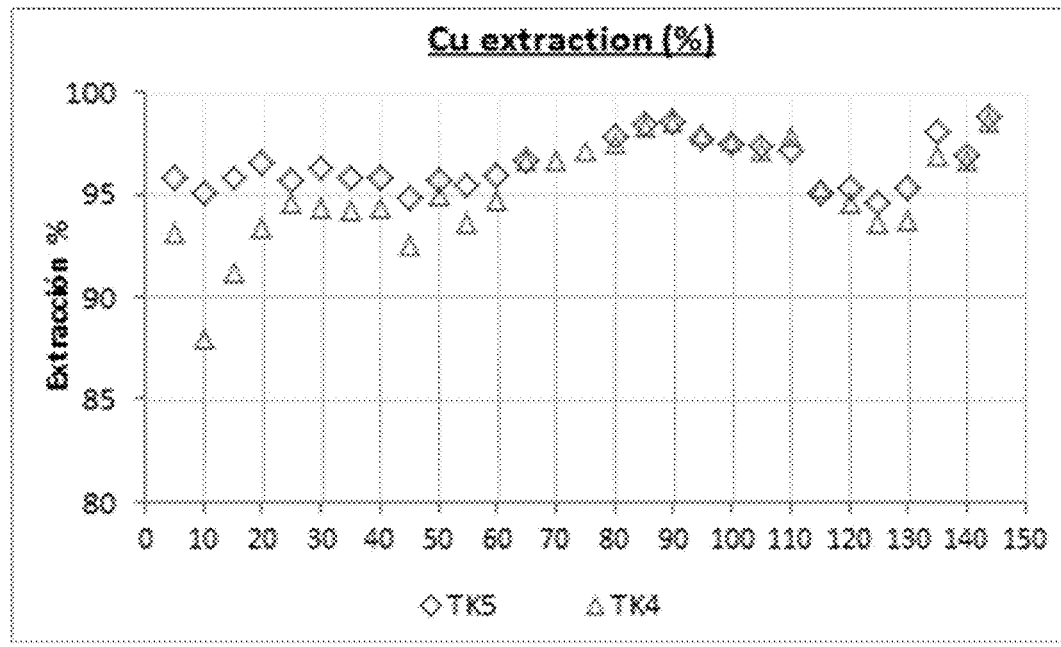
FIG. 10 is a graph showing copper extraction obtained over time utilizing a continuous leach and precipitation pilot plant including five 3 m³ reactors in series.
Figure 11:
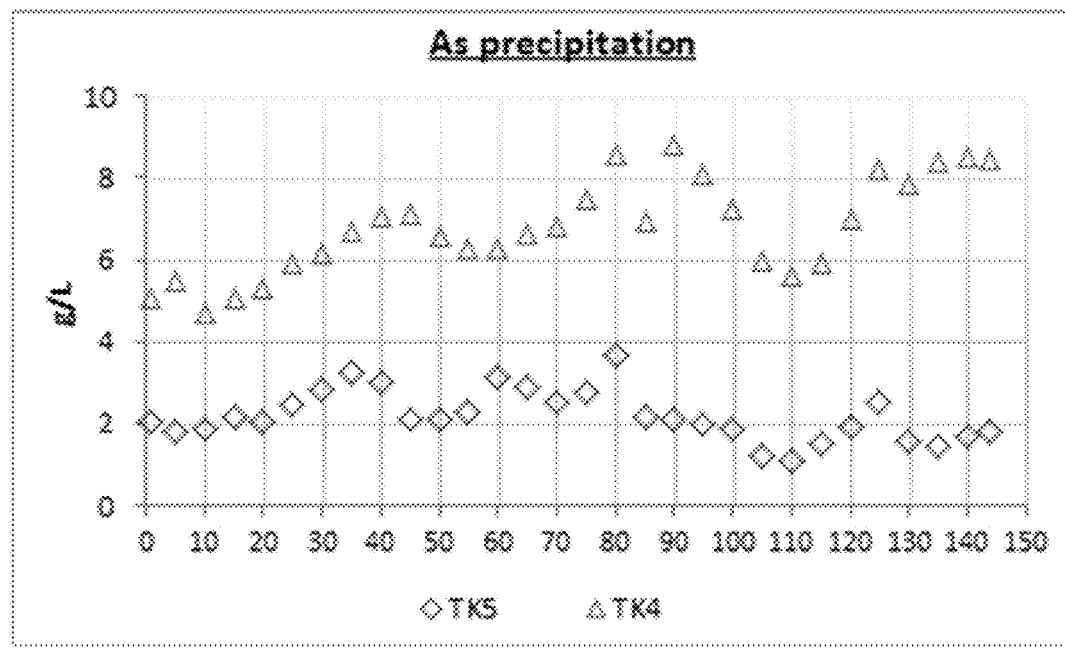
FIG. 11 is a graph showing arsenic concentration in solution over time utilizing the continuous leach and precipitation pilot plant.

FIG. 10 shows the copper extractions over the entire continuous pilot plant campaign of 150 days, and FIG. 11 shows the As concentrations in the solutions in tanks 4 and 5 during the campaign of 150 days. Throughout the majority of the campaign, the copper extraction was at or above 95%. The copper extractions reached 98% during the final two weeks of operation.

The arsenic concentration in Tank #4 varied between 5.7 g/L and 7.4 g/L. As a result of the scorodite seed addition to Tank #5, the As concentrations in solution were consistently reduced by between 3.5 g/L and 5.0 g/L, to concentrations of about 1.7 g/L to 3.5 g/L in the circuit discharge, corresponding to arsenic precipitation degrees of about 60% to 70%. The degree of arsenic precipitation depended primarily on the incoming As concentration, the free acid concentration, and the seed recycle ratio used.

The final leach residue had the approximate mineralogical composition of 62 wt. % scorodite, 11 wt. % elemental sulfur, 9 wt. % pyrite, 2 wt. % enargite, and ~16 wt. % gangue minerals (mostly silicates).

Conclusion

Effective copper extraction and arsenic precipitation as scorodite is achieved by adding scorodite-containing seed material after high copper extraction is already achieved.

EXAMPLE 7

Batch Leaching of Arsenical Copper Concentrate; Effect of Leach Temperature

The following example demonstrates the effect of temperature during oxidative leaching on the copper extracted from an arsenical copper concentrate.

An arsenical copper concentrate containing 29.5 wt. % Cu, 9.3 wt. % As, 17.3 wt. % Fe, 39.1 wt. % total S and 1.42 wt. % Zn was subjected to oxidative leaching in a laboratory, 4 L reaction vessel. The leach tests were carried out at 80° C., 85° C., and 90° C. for 48 hours, in solutions containing an initial 22 g/L Fe$^{3+}$ (as sulfate) and 40 g/L initial H$_2$SO$_4$.

Figure 12:
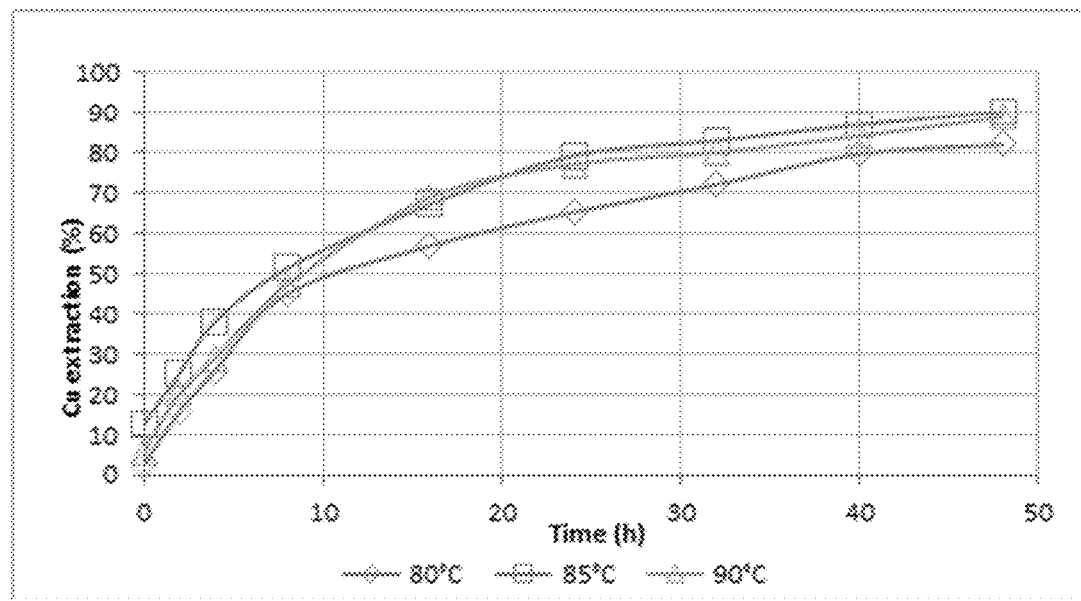
FIG. 12 is a graph showing copper extraction for different oxidative leaching temperatures.

FIG. 12 is a graph illustrating copper extractions at the different oxidative leaching temperatures. The lower curve indicates the copper recovery resulting from oxidative leaching at 80° C. and indicates that more time is required for the extraction of copper during oxidative leaching at this temperature.

FIG. 12 shows that a temperature of 80° C. during oxidative leaching leads to lower extraction of copper after about 48 hours of oxidative leaching. Temperatures of 85° C. and 90° C. during oxidative leaching led to near equivalent extraction of copper after 48 hours. The temperature during oxidative leaching is constrained by the reaction kinetics. Lower temperatures, below about 80° C., are undesirable.

Conclusion

During oxidative leaching, a temperature of at least about 80° C. is desirable for acceptable copper recovery.

EXAMPLE 8

Batch Leaching of Arsenical Copper Concentrate; Effect of Concentrate Regrind

The following example demonstrates the effect of regrind size on the copper extracted during oxidative copper leaching from an arsenical copper concentrate.

An arsenical copper concentrate containing 29.5 wt. % Cu, 9.3 wt. % As, 17.3 wt. % Fe, 39.1 wt. % total S and 1.42 wt. % Zn was subjected to oxidative leaching under the conditions shown in Table 4. Leaching was conducted in a 4 L laboratory reactor, for a period of 48 hours.

TABLE 4

| Reaction Conditions During Oxidative Leaching | | | | |
|---|---|---|---|---|
| Particle size, μm | 10 | 15 | 20 | 25 |
| Temperature, ° C. | 80 | 85 | 85 | 85 |
| Fe$^{+3}$, g/l | 23 | 22 | 23 | 23 |
| H$_2$SO$_4$ Initial, g/l | 40 | 40 | 40 | 40 |

Figure 13:
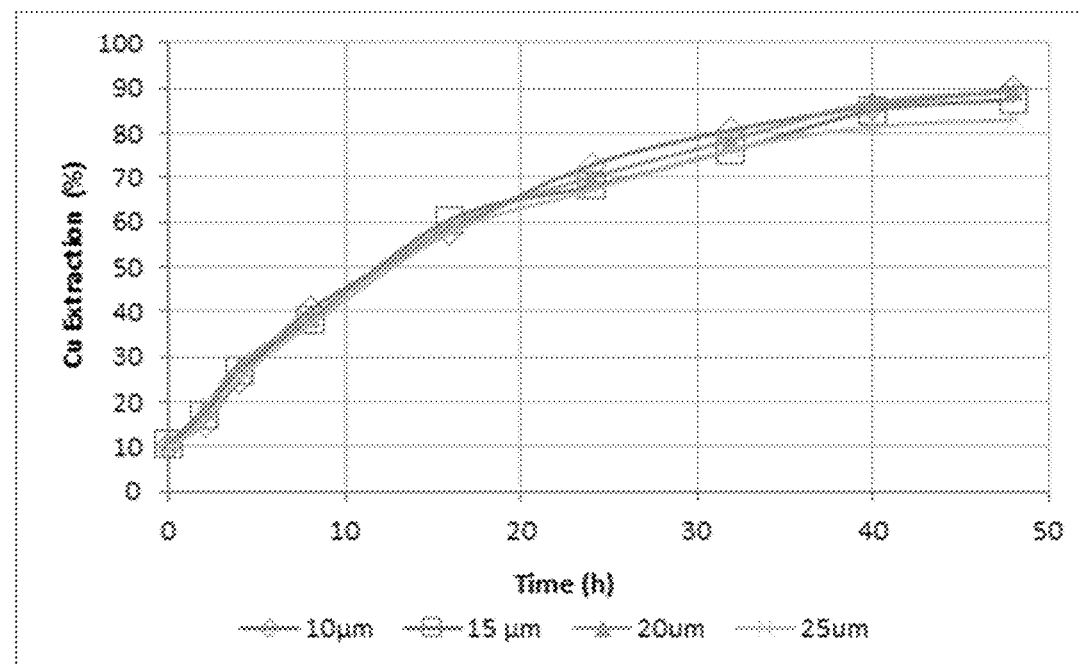
FIG. 13 is a graph showing copper extraction for different particle sizes of arsenical copper concentrate.

FIG. 13 is a graph illustrating copper extractions for different particle sizes of the arsenical copper concentrate. The lower curve indicates the copper extraction resulting from concentrate with a P$_{80}$ of about 25μm and indicates that the leaching rate is slower by comparison to a concentrate with a P$_{80}$ of about 20μm. Particle sizes P$_{80}$ of about 10 μm, P$_{80}$ of about 15 μm, and P$_{80}$ of about 20 μm result in similar copper extraction during oxidative leaching. Regrinding to particle sizes less than P$_{80}$ of about 15 μm has very little effect on the copper extraction from oxidative leaching over the 48 hour period.

Conclusion

Particle size affects copper leach rates and extraction during oxidative pressure leaching.

EXAMPLE 9

Batch Precipitation of Arsenic With Addition of Scorodite-Containing Seed to Leach Slurry; Effect of Precipitation Temperature The following example demonstrates the effect of temperature on the arsenic precipitated during precipitation of arsenic after oxidative leaching of an arsenical copper concentrate.

Arsenic was precipitated from a leach slurry containing 6.4 g/L As, 33.4 g/L $H_2SO_4$, 35 g/L Cu, 43 g/L total Fe, 33.2 g/L $Fe^{3+}$, and 4.2 g/L Zn in solution. The arsenic precipitation tests were carried out under the conditions shown in a 4 L mechanically agitated laboratory reactor, at temperatures ranging from 25° C. to 95° C., with an arsenic recycle ratio, which is the ratio of arsenic in seed to arsenic in solution in the leach slurry, of 4.5:1 and without addition of oxygen for a period of 24 hours.

Figure 14:
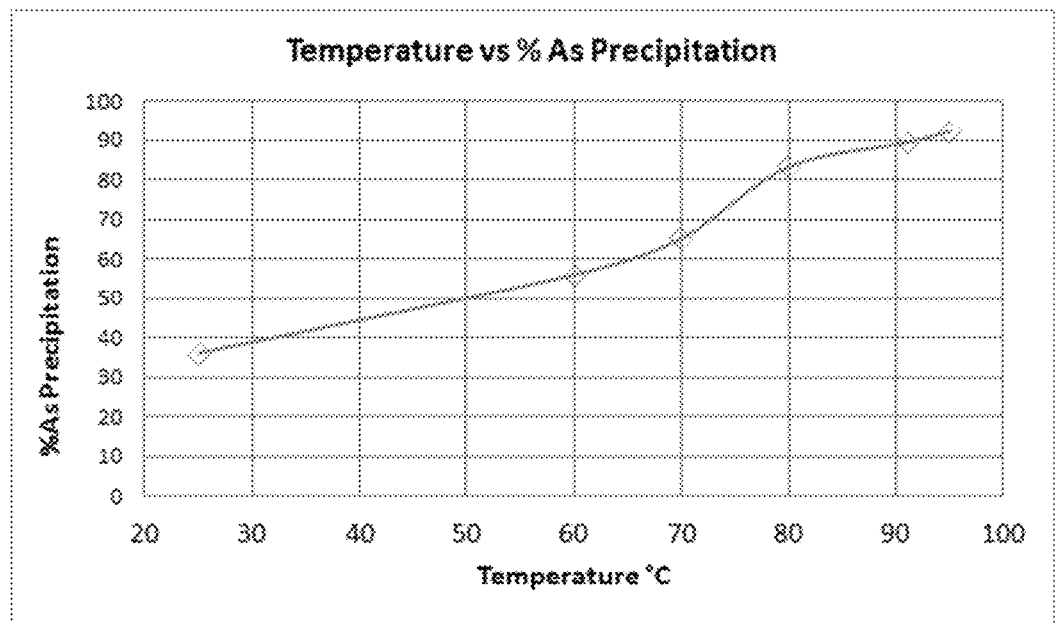
FIG. 14 is a graph showing percentage of arsenic precipitation after scorodite-containing seed addition at different precipitation temperatures.

FIG. 14 is a graph illustrating the percentage of arsenic precipitation at different precipitation temperatures. Temperatures above about 90° C. result in higher arsenic precipitation levels by comparison to lower temperatures.

Conclusion

During precipitation of arsenic, a temperature in the range of about 90° C. to about 95° C. is desirable for arsenic precipitation as scorodite.

EXAMPLE 10

Batch Precipitation of Arsenic From Leach Slurry; Effect of Arsenic, As Scorodite Recycle Ratio.

The following example demonstrates the effect of the ratio of arsenic in scorodite-containing seed to arsenic in solution in the leach slurry on arsenic precipitation.

Arsenic was precipitated from a slurry containing 5.8 g/L As, 23.4 g/L $H_2SO_4$, 23.5 g/L Cu, 32.3 g/L Total Fe, and 17.2 g/L $Fe^{3+}$. The arsenic precipitation tests were carried out on the leach slurry in a 4 L mechanically agitated laboratory reactor at 95° C. for a period of 40 hours, at arsenic ratios ranging from 2.5:1 to 8.2:1.

Figure 15:
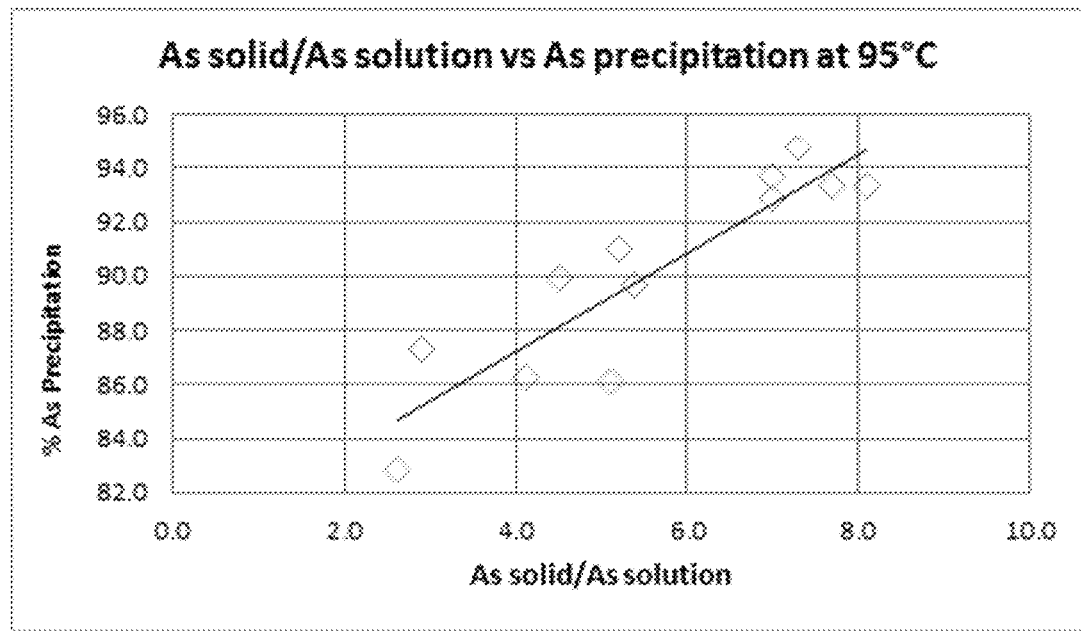
FIG. 15 is a graph showing arsenic precipitation as a percentage of total arsenic in solution with varying arsenic in scorodite-containing seed to arsenic in solution ratios.

FIG. 15 is a graph illustrating the arsenic precipitation as a percentage of total arsenic in solution with varying arsenic in scorodite-containing seed to arsenic in solution ratios. As shown in FIG. 15, higher ratios of arsenic in seed to arsenic in solution results in increased arsenic precipitation from the solution. The higher ratio means a higher quantity of arsenic recirculated, however, which may be constrained in commercial operations because of the size of the equipment that would be required for such high ratios. A ratio of arsenic in seed to arsenic in solution in a range of about 3.5:1 to about 4.5:1 is manageable in a commercial operation and results in acceptable arsenic precipitation levels.

Conclusion

A higher arsenic in seed to arsenic in solution ratio promotes arsenic precipitation after oxidative leaching.

EXAMPLE 11

Batch Precipitation of Arsenic From Leach Slurry; Effect of Oxygen Sparging.

The following example demonstrates the effect of the oxygen sparging during arsenic precipitation after oxidative leaching of an arsenical copper concentrate.

Arsenic was precipitated from a leach slurry containing 5.5 g/L As, 36 g/L $H_2SO_4$, 21.3 g/L Cu, 33.4 g/L total Fe, and 23.4 g/L $Fe^{3+}$ in solution. The arsenic precipitation was carried out under the conditions shown in Table 5, in a 4 L mechanically agitated laboratory reactor. The arsenic was added at an arsenic recycle ratio, which is the ratio of arsenic in seed to arsenic in solution in the leach slurry, of 4.5:1.

TABLE 5

| Arsenic Precipitation Conditions | | |
|---|---|---|
| | No oxygen | $O_2$ addition |
| Temperature, ° C. | 91.5 | 91.5 |
| Initial As, g/lL | 5.5 | 5.5 |
| Initial $Fe^{+3}$, g/L | 23.4 | 23.4 |
| $H_2SO_4$ Initial, g/L | 35.8 | 38 |
| Time, h | 22 | 40 |
| Oxygen, L/min | 0 | 4 |

Figure 16:
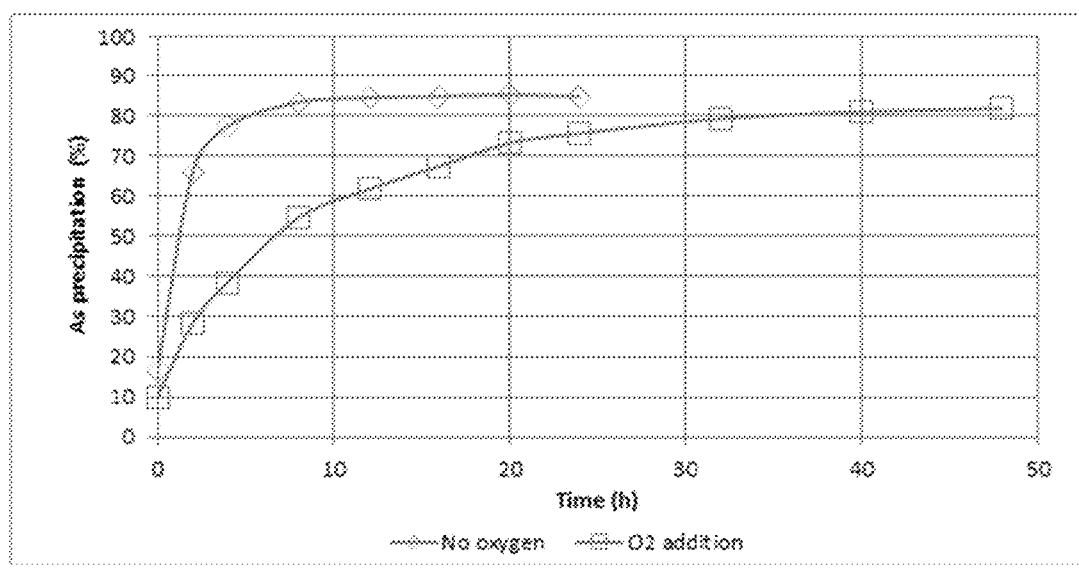
FIG. 16 is a graph showing the effect of oxygen addition during arsenic precipitation.

FIG. 16 is a graph illustrating the effect of oxygen addition during arsenic precipitation. The addition of oxygen has a detrimental effect on the kinetics of arsenic precipitation. Although the arsenic was precipitated, the time to precipitate was up to 5 times longer by comparison to arsenic precipitation without the addition of oxygen during precipitation.

Conclusion

Oxygen addition during scorodite precipitation is unnecessary and leads to longer precipitation time.

The above-described embodiments of the invention are intended to be examples only. Alterations, modifications, and variations may be effected to the particular embodiments by those skilled in the art. Thus, the scope of the claims should not be limited by the embodiments set forth in the examples, but should be given the broadest interpretation consistent with the description as a whole.

The invention claimed is:

1. A process for extraction of copper from an arsenical copper sulfide concentrate, the process comprising:
    atmospheric oxidative leaching of a feed slurry including the arsenical copper sulfide concentrate and an acidic iron sulfate-containing leach solution, in the presence of oxygen to produce a leach slurry including copper and arsenic dissolved into the acidic iron sulfate-containing leach solution;
    after dissolving the copper and arsenic, and before precipitating the arsenic dissolved during the oxidative leaching, recovering pre-precipitation solids from the leach slurry to produce the pre-precipitation solids and a resulting pregnant leach solution including the copper and arsenic;
    introducing scorodite-containing seed to the pregnant leach solution including the copper and arsenic to induce precipitation of the arsenic dissolved during the oxidative leaching, as scorodite, providing a precipitation-induced pregnant leach solution;
    recovering solids from the precipitation-induced pregnant leach solution to produce the solids, including the scorodite, and an arsenic-reduced pregnant leach solution including the copper;
    subjecting the arsenic-reduced pregnant leach solution including the copper to solvent extraction for recovering copper and thereby producing a raffinate including sulfuric acid and iron sulfate;
    recycling at least a portion of the raffinate including the sulfuric acid and iron sulfate to the oxidative leaching.

2. The process according to claim 1, wherein oxidative leaching is carried out at a temperature in a range of about 80° C. to about 95° C.

3. The process according to claim 1, wherein oxidative leaching and introducing scorodite are carried out at a temperature in a range of about 80° C. to about 95° C.

4. The process according to claim 1, wherein recovering solids from the precipitation-induced pregnant leach solution to produce the solids, including the scorodite, and the arsenic-reduced pregnant leach solution including the copper comprises subjecting the precipitation-induced pregnant leach solution to liquid/solid separation.

5. The process according to claim 1, wherein recovering solids from the precipitation-induced pregnant leach solution to produce the solids, including the scorodite, and the arsenic-reduced pregnant leach solution including the copper comprises subjecting the precipitation-induced pregnant leach solution to flotation.

6. The process according to claim 1, wherein the arsenical copper sulfide concentrate comprises pyrite and at least one of enargite, tennantite, and collusite.

7. The process according to claim 1, wherein the arsenical copper sulfide concentrate comprises about 15 to 30% by weight Cu, 15 to 30% by weight Fe, 5 to 12% by weight As, and 30 to 40% by weight total S.

8. The process according to claim 1, wherein introducing the scorodite-containing seed to the pregnant leach solution including the copper and arsenic to induce the precipitation of the arsenic and the precipitation of the arsenic are carried out without adjusting acid concentration before or during precipitation of the arsenic.

9. The process according to claim 1, wherein introducing the scorodite-containing seed to induce precipitation of arsenic is carried out after at least about 75% by weight of the copper is dissolved from the arsenical copper sulfide concentrate during atmospheric oxidative leaching.

10. The process according to claim 9, wherein introducing the scorodite-containing seed to induce precipitation of arsenic is carried out after at least about 95% by weight of the copper is dissolved from the arsenical copper sulfide concentrate during atmospheric oxidative leaching.

11. The process according to claim 1, wherein the raffinate provides sulfuric acid and iron ions to the leach solution.

12. The process according to claim 11, wherein recycling comprises recycling about 60 to about 90% by weight of the raffinate to the atmospheric oxidative leaching.

13. The process according to claim 1, wherein the acidic iron sulfate-containing leach solution contains chloride ions.

14. The process according to claim 1, wherein the recycling is a source of soluble iron in the acidic iron sulfate-containing leach solution.

15. The process according to claim 1, wherein a composition of the leach slurry is controlled by controlling an extent of oxidation during oxidative leaching to control sulfuric acid and soluble iron concentrations for copper dissolution and subsequent precipitation of arsenic as scorodite.

16. The process according to claim 1, wherein the acidic iron sulfate-containing leach solution has a ferric ion concentration of at least about 10 g/L.

17. The process according to claim 1, wherein the leach slurry has a ferric ion concentration in solution in the range of about 15 g/L to about 25 g/L prior to introducing scorodite-containing seed.

18. The process according to claim 1, wherein the acidic iron sulfate-containing leach solution has a sulfuric acid concentration of about 30 g/L to about 60 g/L.

19. The process according to claim 1, wherein an initial concentration of solids in the feed slurry is about 10% to about 30% by weight of solids prior to dissolution of copper and arsenic.

20. The process according to claim 1, wherein the leach slurry includes a carbonaceous catalyst.

21. The process according to claim 1, wherein oxidation of iron-containing minerals in the arsenical copper concentrate is controlled to achieve a molar ferric ion to arsenic ratio in solution of at least 1:1 prior to the precipitation of arsenic as scorodite.

22. The process according to claim 21, wherein oxidation of iron-containing minerals in the arsenical copper concentrate is controlled to achieve a ferric ion concentration in solution of about 15 g/L to about 25 g/L prior to the precipitation of arsenic as scorodite.

23. The process according to claim 1, wherein the arsenic is precipitated at a temperature of about 90° C. to about 95° C.

24. The process according to claim 1, wherein introducing scorodite-containing seed comprises introducing an amount of the scorodite-containing seed to provide an arsenic mass ratio of the arsenic in the scorodite seed material to the soluble arsenic in the pregnant leach solution including the copper and arsenic, in the range of about 3.5:1 to about 4.5:1.

25. The process according to claim 1, wherein introducing the scorodite-containing seed comprises recycling a portion of the solids, including the scorodite, to the pregnant leach solution including the copper and arsenic, to induce the precipitation of the arsenic dissolved during the oxidative leaching, as scorodite.

26. The process according to claim 1, wherein the scorodite-containing seed material is obtained by flotation of the precipitation-induced pregnant leach solution to produce a flotation concentrate and scorodite-rich flotation tailings.

27. The process according to claim 1, wherein recovering solids from the precipitation-induced pregnant leach solution, comprises subjecting the precipitation-induced pregnant leach solution, after precipitating the arsenic, to a flotation, without prior liquid/solid separation, to produce a flotation concentrate and scorodite-rich flotation tailings, wherein the scorodite-containing seed material comprises a portion of the flotation tailings.

28. The process according to claim 1, wherein recovering the pre-precipitation solids from the leach slurry comprises subjecting the leach slurry to liquid/solid separation.

29. The process according to claim 28, wherein the liquid/solid separation comprises thickening, filtration, or both.

30. The process according to claim 28, wherein the liquid/solid separation comprises washing at least some separated solids, and at least some produced washing liquor is combined with the pregnant leach solution including the copper and arsenic.

31. The process according to claim 28, wherein recovering pre-precipitation solids from the leach slurry removes at least 90 wt % of the solids present in the leach slurry.

32. The process according to claim 31, wherein recovering pre-precipitation solids from the leach slurry removes at least 95 wt % of the solids present in the leach slurry.

33. The process according to claim 32, wherein recovering pre-precipitation solids from the leach slurry removes at least 99 wt % of the solids present in the leach slurry.

34. The process according to claim 33, wherein recovering pre-precipitation solids from the leach slurry removes substantially all of the solids present in the leach slurry.

35. The process according to claim 1, wherein an amount of copper extracted during solvent extraction is about 95% by weight of the total copper content or greater.

36. The process according to claim 1, wherein the arsenical copper sulfide concentrate is ground prior to oxidative leaching.

37. The process according to claim 36, wherein the arsenical copper sulfide concentrate is ground to provide a particle size distribution $P_{80}$ of about 15 μm to about 25 μm.

* * * * *